United States Patent [19]
Crano et al.

[11] Patent Number: 4,968,454

[45] Date of Patent: Nov. 6, 1990

[54] VARIABLE-LIGHT TRANSMITTANCE ARTICLE AND METHOD FOR PREPARING SAME

[75] Inventors: John C. Crano; Patricia L. Kwiatkowski, both of Akron, Ohio; Rodney J. Hurditch, Providence, R.I.

[73] Assignee: PPG Industries, Inc., Pittsburgh, Pa.

[21] Appl. No.: 147,430

[22] Filed: Jan. 25, 1988

[51] Int. Cl.$^5$ ............................................... G02B 5/23
[52] U.S. Cl. ..................................... 252/586; 252/582; 252/600; 351/163; 350/354
[58] Field of Search ............... 252/582, 586, 589, 600, 252/583; 351/163; 350/354; 544/71

[56] References Cited

U.S. PATENT DOCUMENTS

| | | | |
|---|---|---|---|
| Re. 25,312 | 1/1963 | Duncan et al. | 501/71 |
| 3,296,004 | 1/1967 | Duncan | 501/71 |
| 3,562,172 | 2/1971 | Ono et al. | 252/600 |
| 3,578,602 | 5/1971 | Ono et al. | 252/600 |
| 3,884,697 | 5/1975 | Inoue et al. | 96/48 |
| 4,215,010 | 7/1980 | Hovey et al. | 252/586 |
| 4,342,668 | 8/1982 | Hovey et al. | 252/586 |
| 4,637,698 | 1/1987 | Kwak et al. | 351/163 |
| 4,699,473 | 10/1987 | Chu | 350/409 |
| 4,720,547 | 1/1988 | Kwak et al. | 544/71 |
| 4,784,474 | 11/1988 | Yamamoto et al. | 350/354 |
| 4,816,584 | 3/1989 | Kwak et al. | 544/71 |
| 4,818,096 | 4/1989 | Heller et al. | 351/163 |

FOREIGN PATENT DOCUMENTS

| | | |
|---|---|---|
| 246114 | 11/1987 | European Pat. Off. . |
| 250193 | 12/1987 | European Pat. Off. . |
| 62-155283 | 7/1987 | Japan . |
| 62-195075 | 8/1987 | Japan . |
| 85/02619 | 6/1985 | PCT Int'l Appl. . |
| 2171404 | 8/1986 | United Kingdom . |
| 2174711 | 11/1986 | United Kingdom . |

OTHER PUBLICATIONS

Chu, N. Y. C., Can. J. Chem. 61, 302, 1983.

*Primary Examiner*—John S. Maples
*Assistant Examiner*—Richard Treanor
*Attorney, Agent, or Firm*—Irwin M. Stein

[57] ABSTRACT

Variable-transmittance articles, such as an ophthalmic lens, are prepared by applying to or incorporating within the article a combination of two (or more) organic photochromic substances exhibiting different activated absorption maxima within the matrix in which the substances are incorporated. One organic photochromic substance has an absorption maximum within the range of between greater than 590 and about 700 nanometers. The other organic photochromic substance exhibits at least one absorption maximum and preferably two absorption maxima, within the range of between about 400 and less than 500 nanometers. The organic photochromic substances are used in a proportion to achieve a near neutral coloring of the article. The article may also be tinted with a light compatible tint (dye) to achieve a more neutral color when the photochromic substances are activated.

23 Claims, No Drawings

VARIABLE-LIGHT TRANSMITTANCE ARTICLE AND METHOD FOR PREPARING SAME

DESCRIPTION OF THE INVENTION

The present invention relates to variable-light transmittance articles, a method for producing such articles, and photochromic compositions useful for preparing such articles. More particularly, the present invention relates to such articles and compositions in which the property of variable-light transmittance is provided by a combination of certain organic photochromic substances.

Attempts to produce a material whose spectral transmittance is reversibly variable according to the amount of light and the wave length of light that passes therethrough have led, in the field of organic chemistry, to the development of organic photochromic substances. A transparent organic host material containing an organic photochromic substance has its transmittance reduced upon irradiation with ultraviolet rays, such as from sunlight, the light of a mercury lamp, or visible rays of short wave lengths (hereinafter referred to simply as "light"), but resumes its original transmittance when the irradiation is discontinued or the article stored in the dark.

When incorporated into transparent plastic ophthalmic articles, e.g., a lens, and activated with "light", many organic photochromic substances exhibit a narrow absorption band in the visible spectrum, which leads to a color, e.g., blue, that is not normally aesthetically acceptable to lens-wearing consumers. Preferably, an organic transparent material containing a photochromic substance will, when activated with "light", change to a more near neutral color, such as neutral gray or neutral brown. In particular, a neutral gray with or without a very slight bluish tint is expected to be most pleasing to consumers.

It has now been discovered that combinations of certain organic photochromic substances will produce, when activated at room temperature, a more desirable near neutral color. More particularly, it has been discovered that the appropriate combination of an organic photochromic substance having an activated absorption maximum in the visible range of greater than 590 nanometers, and an organic photochromic substance having at least one activated absorption maximum in the visible range of between about 400 nanometers and less than 590 nanometers can produce in a suitable matrix (when activated) a near neutral color, e.g., a gray color. A color even closer to neutral gray for the host material may be achieved, for example, by applying a small amount of compatible tint (dye) to the photochromic substance-containing host material.

DETAILED DESCRIPTION OF THE INVENTION

The first group of organic photochromic substances used in the practice of the present invention are those having an activated absorption maximum of greater than 590 nanometers within the visible range. Preferably, the activated absorption maximum of this first group of organic photochromic substances is at least 600 nanometers. Generally, the activated absorption maximum is between about 600 and 650 nanometers, e.g., about 620 nanometers. Such organic photochromic substances typically exhibit a blue, bluish-green, or bluish-purple color when exposed to ultraviolet light in an appropriate solvent or matrix. Examples of organic photochromic substances that exhibit such an activated absorption maximum are spiro(indolino) naphthoxazines, spiro(indolino) pyridobenzoxazines, spiro(benzindolino) naphthoxazines and spiro(benzindolino) pyridobenzoxazines. Mixtures of such spiro(indoline)-type substances may be used in the practice of the present invention.

Spiro(indolino) naphthoxazines are well known in the art. See, for example, U.S. Pat. Nos. 3,562,172, 3,578,602, 4,215,010, 4,342,668 and U.K. patent application 2,171,404. Spiro(indolino) pyridobenzoxazines are described in U.S. Pat. No. 4,637,698. Spiro(benzindolino) pyridobenzoxazines and spiro(benzindolino) naphthoxazines are the subject of co-pending and co-assigned U.S. Pat. Application Ser. No. 78,325, filed July 27, 1987 now abandoned. The disclosures of the aforesaid patents and patent application respecting such spiro(indoline)-type substances are hereby incorporated by reference.

Organic photochromic substances that have at least one activated absorption maximum in the visible range of between about 400 and less than 590 nanometers include spiro(indolino) benzoxazines. Such benzoxazines are described in co-assigned, co-pending U.S. Pat. Application Ser. No. 929,936, filed Nov. 12, 1986 now abandoned, the disclosure of which is hereby incorporated by reference. Mixtures of organic photochromic substances exhibiting at least one absorption maximum, and preferably two absorption maxima, in the described range between 400 and less than 590 nanometers may be used. The activated absorption maxima of this second group of photochromic substances are preferably in the range between about 400 and about 570 nanometers. Photochromic substances, other than the described spiro(indolino) benzoxazines, that exhibit the aforedescribed activated absorption maxima may also be used alone or in combination with spiro(indolino) benzoxazines in the practice of the present invention.

The organic photochromic substances of Group I, i.e., those exhibiting an activated absorption maximum between greater than 590 and about 700 nanometers, are selected to complement the organic photochromic substances of Group II, i.e., those exhibiting an activated absorption maximum of between about 400 and less than 590 nanometers, and vice versa. Thus, the photochromic substances of Groups I and II are selected so that their respective activated absorption maxima are not close to one another; but, are sufficiently spaced apart so that when the spectra of the substances are combined there is a complementary rather than an additive effect. That complementary effect results in a smoothing out or leveling of the combined spectra to produce a more neutral color rather than an enhanced single absorption maximum. In other terms, one photochromic substance is selected so that it absorbs (when activated) in a region of the spectrum where the other photochromic substance does not absorb strongly, and vice versa.

The organic photochromic substances of Group I and Group II are combined in amounts and in a ratio such that the organic host material containing same exhibits a substantially neutral color when activated with light, e.g., a near neutral gray or brown color. A near neutral gray color exhibits a spectrum that has relatively equal absorption in the visible range between 400 and 700 nanometers, e.g., between 440 and 660 nanometers. A near neutral brown color exhibits a spectrum in which the absorption in the 400-550 nanometer range is moderately larger than in the 550-700 nanometer range.

An alternative way of describing color is in terms of its chromaticity coordinates, which describe the qualities of a color in addition to its luminance factor, i.e., its chromaticity. In the CIE system, the chromaticity coordinates are obtained by taking the ratios of the tristimulus values to their sum, e.g., $x=X/X+Y+Z$ and $y=Y/X+Y+Z$. Color as described in the CIE system can be plotted on a chromaticity diagram, usually a plot of the chromaticity coordinates x and y. See pages 47-52 of *Principles of Color Technology*, by F. W. Billmeyer, Jr. and Max Saltzman, Second Edition, John Wiley and Sons, N.Y. (1981).

The relative amounts of the photochromic substances of Groups I and II required to obtain the desired near neutral color will vary and depend upon the activated absorption maxima exhibited by the specific organic photochromic substances utilized. Generally, the mole ratio of the Group I photochromic substance to the Group II photochromic substance may vary from about 1:0.5 to about 1:15, e.g., between about 1:4 and about 1:12, more particularly between about 1:6 and about 1:10. As used in the specification and claims, a near neutral color is one in which the chromaticity coordinate values of "x" and "y" for the color are within the following ranges (D65 illuminant): $x=0.260$ to $0.400$, $y=0.280$ to $0.400$ following activation to 40 percent luminous transmission by exposure to solar radiation (Air Mass 1 or 2).

The organic photochromic substances of groups I and II may be applied to or incorporated into the host material by methods known in the art; and they may be applied to or incorporated into the host material separately, e.g., sequentially (in any order) or as a mixture. Further, when the host material is a transparent article, such as a lens, which has opposite surfaces exposed, it is contemplated that the organic photochromic substance(s) of one Group may be applied to one side of the transparent article and the organic photochromic substance(s) of the other Group applied to the opposite side, that the photochromic substances of both Groups be applied to one side of the transparent article (separately or together as a mixture) or to both sides of the article (separately or as a mixture).

Adjuvant materials may also be incorporated into the host with the photochromic substances prior to or subsequent to their application or incorporation into the host material. For example, ultraviolet light absorbers may be admixed with photochromic substances before their application to the host material or such absorbers may be superposed, e.g., superimposed, as a layer between the photochromic substance and the incident light. Further, stabilizers may be admixed with the photochromic substances prior to their application to the host material to improve the light fatigue resistance of the photochromic substances. Stabilizers such as hindered amine light stabilizers and singlet oxygen quenchers, such as a nickel ion complex with an organic ligand, are contemplated. They may be used alone or in combination. Such stabilizers are described in European patent application 195,898.

Compatible (chemically and color-wise) tints, i.e., dyes, may be applied to the host material to achieve a more aesthetic result, for medical reasons, or for reasons of fashion. The particular dye selected will vary and depend on the aforesaid need and result to be achieved. In one embodiment, the dye may be selected to complement the color resulting from the activated photochromic substances, e.g., to achieve a more neutral color or absorb a particular wavelength of incident light. In another embodiment, the dye may be selected to provide a desired hue to the host matrix when the photochromic substances are unactivated. Finally, appropriate protective coating(s) may be applied to the surface of the host material. These may be abrasion resistant coatings or coatings that serve as oxygen barriers, e.g., a polyvinyl alcohol coating. Such coatings are known in the art.

Photochromic substances or compositions containing same may be applied to or incorporated into a host material by various methods. Such methods include dissolving or dispersing the substance within the host material, e.g., imbibition of the photochromic substance into the host material by immersion or thermal transfer; incorporation of the photochromic substance as a separate layer between adjacent layers of the host material; and applying the photochromic substance as a coating to the host material. The term "imbibition" or "imbibe" is intended to mean and include permeation of the photochromic substance alone into the host material, solvent assisted transfer absorption of the photochromic substance into a porous polymer, vapor phase transfer, and other such transfer mechanisms. For example:

(a) The photochromic substances or compositions containing same may be mixed with a polymerizable composition that, upon curing, produces a polymeric host material and the polymerizable composition cast as a film, sheet or lens, injection molded or otherwise formed into a sheet or lens, or polymerized by emulsion or suspension polymerization to form a photochromic particulate material that may be used as a pigment;

(b) The photochromic substance may be dissolved or dispersed in water, alcohol or other solvents or solvent mixtures and then imbibed into the solid host material by immersion of the solid host material for from several minutes to several hours, e.g., 2-3 minutes to 2-4 hours, in a bath of such solution or dispersion. The bath is conventionally at an elevated temperature, usually in the range of 50°-120° C.; however, higher temperatures may be used. Thereafter, the host material is removed from the bath and dried;

(c) The photochromic substance and compositions containing same may also be applied to the surface of the host material by any convenient manner, such as spraying, brushing, spin-coating or dip-coating from a solution or dispersion of the photochromic substance in the presence of a polymeric binder. Thereafter, the photochromic substance is imbibed into the host material by heating it, e.g, in an oven, for from a minute to several hours at temperatures in the range of from 80°-180° C.;

(d) In a variation of the preceding imbibition procedure, the photochromic substance or composition containing same may be deposited onto or absorbed by a temporary support, e.g., a sheet of kraft paper, aluminum foil, polymer film or fabric, which is then placed in near proximity or in contact with the host material and heated, e.g., in an oven. This and the preceding procedure may be repeated one or more times to imbibe the desired amount of photochromic substance into the host material;

(e) The photochromic substance may be dissolved or dispersed in a transparent polymeric material which may be applied to the surface of the host in the form of an adherent film by any suitable technique such as spraying, brushing, spin-coating or dip-coating; and finally (f) The photochromic substance may be incorporated in or applied to a transparent polymeric material by any of the above-mentioned methods, which can then be placed within the host material as a discrete layer intermediate to adjacent layers of the host material(s).

In addition, imbibition of photochromic substances into a host material may be accomplished by the method described in U.K. Patent Application 2,174,711, which is hereby incorporated in toto by reference. In that method a substantially mottle-free, substantially homogeneous film of polymeric resin having the photochromic substance dissolved therein is applied to the surface of the host material. The film-bearing host material is heated to temperatures near to but below the melting temperature of the photochromic substance for a time sufficient to incorporate a photochromic amount of the photochromic substance into the surface of the host. The photochromic-lean film is then removed from the host surface with a suitable solvent.

Imbibition of photochromic substances into a host material, e.g., an ophthalmic lens, to produce a near neutral gray or brown color, as described herein, may suitably be carried out by dissolving the photochromic substances of Groups I and II that are to be used (in their appropriate mole ratio) in a suitable solvent, e.g., toluene, and absorbing the resulting solution into a temporary substrate, such as filter paper or other substrates described in subparagraph (d) above. The concentration of the photochromic substances in the solvent may vary and will depend on the solubility of the substances in the solvent used. Suitably the photochromic substances will be present in the solvent at a concentration of from about 5 to 15, e.g., 10, weight percent. The temporary substrate may be a flexible material that can take the shape of the surface of the host material on which it is placed if such surface is irregular or not flat such as the curved surface of a lens.

The temporary substrate containing the solution of photochromic substances is dried to remove the solvent and the substrate placed in contact with the surface of the host material. Optionally, a metal cap having the shape of the host material surface is placed on top of the temporary substrate to insure uniform contact of the interface of the substrate and host surface. For example, when the host is a lens, the cap and temporary substrate should be shaped to conform to the shape of the lens, e.g., the convex or concave surface of the lens. This sandwich comprising the metal cap-temporary substrate-host material is then heated for a time sufficient to imbibe a photochromic amount of the photochromic substances into the subsurface of the host material. Heating times may range from about 15 minutes to 120 minutes, usually from 45 to 90 minutes at transfer temperatures, which may range from 145° C. to 155° C.

The aforesaid process may be repeated one or more times, e.g., at least twice, to imbibe the desired amount of the photochromic substances into the surface of the host material, e.g., into a layer of the surface up to about 50 microns thick. In the case of semi-finished lenses, the imbibition process is performed on the front (convex) surface of the lens to allow finishing (grinding) of the back (concave) surface. Further, as described and claimed in a co-assigned application to another, the edges of the lens may be ground to remove imperfections before thermally transferring the photochromic substances. If desired, the host material may then be tinted with a color compatible dye e.g., a brown, yellow-brown or gray dye. Typically, tinting is accomplished by immersion of the host material in a heated aqueous dispersion of the selected dye. The degree of tint is controlled by the temperature of the dye bath and the length of time the host material is allowed to remain in the bath. Generally, the dye bath is at temperatures of less than 100° C., e.g., from 70° C. to 90° C., such as 80° C., and the host material remains in the bath for less than five (5) minutes, e.g., between about 0.5 and 3 minutes, e.g., about 2 minutes. The degree of tint is such that the resulting article exhibits from about 70 to 85 percent, e.g., 80–82 percent, light transmission.

In the case of an ophthalmic lens imbibed with a combination of spiro(indolino) pyrido benzoxazine and spiro(indolino) benzoxazine photochromic substances, the lens may have a residual slightly yellow tinge after the imbibition process. A compatible dye, for example, a magenta dye, may be used to tint the lens to obtain a slightly brownish hue. The particular dye used to tint the photochromic substance-containing host material, as discussed, will depend on the color desired for the host material in its activated and/or unactivated state under conditions of use, e.g., temperature, and the amount and wave length of incident "light" on the lens.

Transparent (non-tinted) organic host materials, e.g., lenses prepared from polymerizates of diethylene glycol bis (allyl carbonate), containing the herein described combination of photochromic substances typically exhibit a light transmission level of at least about 89 percent in the unactivated state. When tinted, such materials may exhibit an unactivated light transmission of between about 70 and 85 percent, e.g., 80–82 percent. When irradiated with "light", such host materials (whether or not tinted) may exhibit a light transmission level ranging from about 10 to about 60, e.g., 20 to 50, percent at ordinary conditions (temperature and sunlight). Extremes of temperature and sunlight can affect the light transmission level.

Photochromic substances having an activated absorption maximum of between greater than 590 and about 700 nanometers include spiro(indolino)-type compounds such as spiro(indolino) naphthoxazines, spiro(indolino) pyridobenzoxazines, spiro(benzindolino) pyridobenzoxazines and spiro(benzindolino) naphthoxazines. Such spiro(indolino)-type compounds may be represented by the following graphic formula:

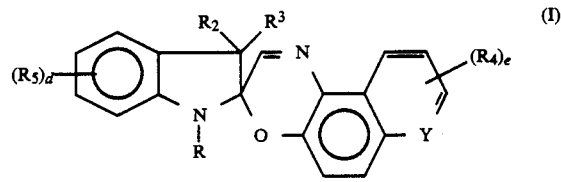

In the above graphic formula I, $R_1$ is selected from the group consisting of $C_1$–$C_8$ alkyl, e.g., methyl, ethyl, propyl, butyl, etc., phenyl, phen($C_1$–$C_4$)alkyl, e.g., benzyl, naphth($C_1$–$C_4$)alkyl, e.g., 1-naphthylmethyl, allyl, acrylyl($C_2$–$C_6$)alkyl, methacrylyl($C_2$–$C_6$)alkyl, carboxy($C_2$–$C_6$)alkyl, e.g., β-carboxyethyl, γ-carboxypropyl and δ-carboxybutyl, cyano($C_2$–$C_6$)alkyl, e.g., β-cyanoethyl, γ-cyanopropyl, β-cyanoisopropyl, and δ-cyanobutyl, $C_1$–$C_4$ acyloxy($C_2$–$C_6$)alkyl, i.e., [$R_cC(O)OR_d$-, wherein $R_c$ is a $C_1$–$C_4$ alkyl and $R_d$ is a $C_2$–$C_6$ alkyl], e.g., acetoxyethyl, acetoxypropyl, propionyloxyethyl, acetoxybutyl, and propionyloxypropyl, hydroxy($C_2$–$C_6$)alkyl. e.g., hydroxyethyl, hydroxypropyl and hydroxybutyl, ($C_2H_4O$)$_m$$CH_3$, wherein m is a number of from 1 to 6, and mono- and di-substituted phenyl, said phenyl substituents being delected from $C_1$–$C_4$ alkyl and $C_1$–$C_5$ alkoxy, e.g. methoxy, ethoxy, propoxy, butoxy and pentoxy. Preferably, $R_1$ is selected from the group consisting of $C_1$–$C_4$ alkyl, phenyl, benzyl, 1-naphth($C_1$–$C_2$)alkyl, such as 1-naphthylmethyl, carboxy($C_2$–$C_4$)-alkyl, cyano($C_2$–$C_4$)alkyl, $C_1$–$C_4$ acyloxy($C_2$–$C_4$)alkyl, e.g., $C_1$–$C_4$ acyloxyethyl, hydroxy-($C_2$–$C_4$)alkyl and ($C_2H_4O$)$_m$$CH_3$, wherein m is a number of from 1 to 3, e.g., 2.

$R_2$ and $R_3$ of formula I are each selected from the group consisting of $C_1$–$C_5$ alkyl, phenyl, mono- and di-substituted phenyl, benzyl, or $R_2$ and $R_3$ may combine to form a cyclic ring selected from the group consisting of an alicyclic ring containing from 6 to 8 carbon atoms (including the spiro carbon atom), norbornyl and adamantyl. The aforesaid phenyl substituents may be selected from $C_1$–$C_4$ alkyl and $C_1$–$C_5$ alkoxy radicals. More particularly, $R_2$ and $R_3$ are each selected from $C_1$–$C_5$ alkyl. e.g., methyl, ethyl, propyl, butyl and pentyl, and phenyl. When one of $R_2$ or $R_3$ is a tertiary alkyl radical, such as tertiary butyl or tertiary amyl, the other is preferably an alkyl radical other than a tertiary alkyl radical.

Y in graphic formula I may be carbon or nitrogen. The number and type of non-hydrogen substituent group represented by $R_4$ will vary depending upon whether Y is carbon or nitrogen. Generally, when Y is carbon each $R_4$ substituent may be selected from the group consisting of halogen, e.g., chloro, fluoro, or bromo, $C_1$–$C_5$ alkyl, $C_1$–$C_5$ alkoxy, e.g., methoxy, ethoxy, propoxy, butoxy and pentoxy, nitro, cyano, thiocyano, $C_1$–$C_4$ monohaloalkyl, e.g., $C_1$–$C_4$ monochloralkyl, such as chloromethyl and chloroethyl, $C_1$–$C_2$ polyhaloalkyl, as, for example, trihaloalkyl such as trichloroalkyl or trifluoroalkyl, e.g., trifluoromethyl and 2,2,2-trifluoroethyl, and monoalkylamino or dialkylamino wherein the alkyl moiety of the alkylamino group contains between one to four carbon atoms, e.g., methylamino, ethylamino, propylamino, dimethylamino and diethylamino.

The letter "e" in graphic formula I is an integer of from 0 to 2, e.g., 1, and denotes the number of non-hydrogen substituents. In particular, when "e" is 1 or 2 and Y is carbon, each $R_4$ substituent may be selected from the group $C_1$–$C_2$ alkyl, $C_1$–$C_2$ alkoxy. chloro, fluoro, bromo, nitro, and trifluoromethyl. When "e" is 0 (zero), there are no non-hydrogen substituents and all of the aromatic carbon atoms have their full complement of hydrogen atoms.

When Y is nitrogen, each $R_4$ non-hydrogen substituent may be selected from $C_1$–$C_5$ alkyl, e.g., $C_1$–$C_2$ alkyl, $C_1$–$C_5$ alkoxy, e.g., $C_1$–$C_2$ alkoxy, and halogen, e.g., chloro, fluoro or bromo. Typically, "e" is 0 (zero) when Y is nitrogen and thus there are no non-hydrogen substituents.

$R_5$ in graphic formula I may be selected from $C_1$–$C_5$ alkyl, halogen, $C_1$–$C_5$ alkoxy, nitro, cyano, $C_1$–$C_4$ monohaloalkyl, $C_1$–$C_4$ polyhaloalkyl, $C_1$–$C_8$ alkoxycarbonyl, $C_1$–$C_4$ acyloxy, i.e., $R_cC(O)O$-, wherein $R_c$ is a $C_1$–$C_4$ alkyl, e.g., methyl, phenylene and substituted phenylene, wherein such phenylene substituents may be selected from the group consisting of halogen, $C_1$–$C_5$ alkyl, $C_1$–$C_5$ alkoxy, cyano, $C_1$–$C_8$ akoxycarbonyl, $C_1$–$C_2$ polyhaloalkyl, $C_1$–$C_4$ monohalalkyl and monoalkylamino or dialkylamino, wherein the alkyl moiety of the alkylamino group contains from 1 to 4 carbon atoms. The number of substituents on the phenylene group may range from 0 to 2 and may be the same or different. The letter "d" in graphic formula I may vary from 0 to 4, e.g., 0 to 2, such as 1 or 2, and denotes the number of non-hydrogen substituents. When one $R_5$ substituent is phenylene or substituted phenylene, the letter "d" is 1 or 2. In that event, when "d" is 2, the second substituent is other than a phenylene or substituted phenylene group. When "d" is 0 (zero), there are no non-hydrogen substituents as described with respect to "e".

More particularly, spiro(indolino) pyridobenzoxazines that may be used in the practice of the present invention may be represented by the following graphic formula:

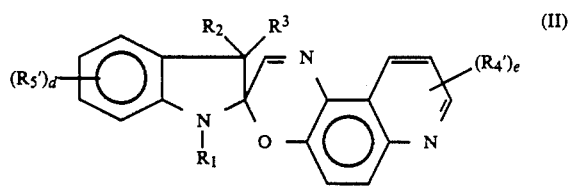

In graphic formula II, $R_1$, $R_2$ and $R_3$ are the same as defined with respect to graphic formula I. $R_4'$ may be selected from $C_1$–$C_5$ alkyl, e.g., $C_1$–$C_2$ alkyl, $C_1$–$C_5$ alkoxy, e.g., $C_1$–$C_2$ alkoxy and halogen, e.g., chloro, fluoro or bromo. The letter "e" may vary from 0 to 1. Commonly "e" is 0, and thus, there are no non-hydrogen substituents. When "e" is 1, the $R_4'$ substituent may be located on any of the available carbon atoms of the pyridobenz moiety of the pyridobenzoxazine portion of the compound, i.e., at the 5', 6', 8', 9' or 10' positions, most usually at the 8', 9' or 10' positions. When "e" is 2, the $R_4'$ substituent may be the same or different and, in either case are selected from the above-described group and are located at two of the aforedescribed available carbon atoms.

$R_5'$ in graphic formula II may be selected from the group consisting of $C_1$–$C_5$ alkyl, e.g., methyl, ethyl, propyl, butyl and pentyl, halogen, e.g., chloro and fluoro, $C_1$–$C_5$ alkoxy, e.g., methoxy, ethoxy, propoxy, butoxy and pentoxy, nitro, cyano, $C_1$–$C_4$ monohaloalkyl, e.g., chloromethyl, fluoromethyl, chloroethyl, chloropropyl, etc., $C_1$–$C_4$ polyhaloalkyl, e.g., trihaloalkyl, $C_1$–$C_8$ alkoxycarbonyl, and $C_1$–$C_4$ acyloxy, i.e., $R_cC(O)O$-, wherein $R_c$ is a $C_1$–$C_4$ alkyl, e.g., methyl. An example of an acyloxy group is acetoxy. While any halogen, i.e., chlorine, bromine, iodine and fluorine may be used in respect to the aforesaid halogen or haloalkyl substituents, chlorine, fluorine and bromine, particularly chlorine and fluorine is preferred for the halogen substituent and fluorine is preferred for the polyhaloalkyl substituent, e.g., trifluoromethyl, ($CF_3$). Preferably, $R_5'$ is selected from the group consisting of $C_1$–$C_2$ alkyl, chlorine, fluorine, $C_1$–$C_2$ trihaloalkyl, e.g., trihalomethyl such as trifluoromethyl and $C_1$–$C_5$ alkoxy.

The letter "d" in graphic formula II is an integer from 0 to 4, e.g., 0 to Z. such as I or 2. When "d" is Z or more, the $R_5'$ substituent may be the same or different and in either case, are selected from the aforedescribed group. The $R_5'$ substituent(s) may be located on any of the available carbon atoms of the indolino portion of the compound, i.e., at the 4, 5, 6 or 7 positions. When "d" is 2, the $R'_5$ substituents may be present at the 4 and 5, 5 and 6, 4 and 7 or 6 and 7 carbon atoms of the indolino moiety.

The spiro(indolino) pyridobenzoxazines may be synthesized by reaction of the corresponding nitrosohydroxy quinoline with the corresponding free indoline (Fischer's base) or indolium salt, e.g., the iodide salt, compound. Such compounds and their synthesis are described in U.S. Pat. No. 4,637,698, which is incorporated herein by reference.

It is possible that the photochromic organic substances of graphic formula II (and III) can be a mixture of isomers due to the alternative directional mechanism by which intramolecular condensation occurs during formation of the starting indole reactant (Fischer's base). Indolization of 3-substituted phenylhydrazones can give rise to a 4-substituted indole, a 6-substituted indole, or mixtures thereof. Thus, when "d" is 1, the photochromic substance may be substituted at the 4 position on the indoline ring, at the 6 position of that ring or comprise a mixture of such isomers. When "d" is 2, the photochromic substance may be substituted at any combination of the 4, 5, 6, or 7 carbon atoms of the indoline ring (as heretofore indicated) and may comprise an isomeric mixture of such compounds, e.g., a mixture of compounds having substituents at the 4 and 5, 4 and 6, 5 and 6, 4 and 7, 5 and 7, and 6 and 7 positions of the indoline ring. Commonly, when "d" is 2 the substituents are located at the 4 and 5, or 5 and 6 positions. Also contemplated are materials containing mixtures of such isomers. e.g., materials comprising 4 (and 6) and 5-substituted spiro(indolino) benzoxazines.

Examples of spiro(indolino) pyridobenzoxazines selected from the description of graphic formula II that may be employed in the process of the present invention are described in Table I. Such pyridobenzoxazines are those in which $R_1$, $R_2$, $R_3$, and $R_5'$ are as indicated in Table I, the letter "e" is 0 (zero), and the letter "d" is 0, 1 or 2. A hyphen (-) indicates the absence of a non-hydrogen substituent.

TABLE I

| Compound/ | $R_1$ | $R_2$ | $R_3$ | $R'_5$ | $R'_5$ |
|---|---|---|---|---|---|
| 1 | $CH_3$ | $CH_3$ | $CH_3$ | — | — |
| 2 | $CH_3$ | $CH_3$ | $CH_3$ | — | 4-$CH_3$ | 5-$CH_3$ |
| 3 | $CH_3$ | $CH_3$ | $CH_3$ | 5-$OCH_3$ | — |
| 4 | $CH_3$ | $CH_3$ | $CH_3$ | 5-Cl | 6-$CH_3$ |
| 5 | $CH_3$ | $CH_3$ | $C_2H_5$ | — | — |
| 6 | $CH_3$ | $CH_3$ | $C_2H_5$ | 5-$CH_3$ | 6-$CH_3$ |
| 7 | $CH_3$ | $C_2H_5$ | $C_2H_5$ | — | — |
| 8 | n-$C_4H_9$ | $CH_3$ | $C_2H_5$ | — | — |
| 9 | $CH_3$ | $CH_3$ | phenyl | — | — |
| 10 | $CH_3$ | phenyl | phenyl | — | — |
| 11 | $C_2H_5$ | $CH_3$ | $C_2H_5$ | 4-$CH_3$ | 5-$CH_3$ |
| 12 | n-$C_4H_9$ | $CH_3$ | $C_2H_5$ | 5-$CH_3$ | 6-$CH_3$ |
| 13 | $CH_3$ | $CH_3$ | $CH_3$ | 5-$CH_3$ | 6-$CH_3$ |
| 14 | n-$C_3H_7$ | $CH_3$ | $CH_3$ | 5-$OCH_3$ | — |

Compound 2 in Table I may be named 1,3,3,4,5-pentamethylspiro [indolino-2,3' [3H] pyrido [3,2-f] [1,4] benzoxazine]. Similarly, compound 6 in Table I may be named 1,3,5,6-tetramethyl-3-ethylspiro [indolino-2,3' [3H] pyrido [3,2-f] [1,4] benzoxazine]. Other compounds in Table I can be similarly named taking into account the different substituents. Moreover, compounds selected from the description of graphic formula II may be similarly named by substituting the substituents described with respect to $R_1$, $R_2$, $R_3$, $R_4'$ and $R_5'$ for those found in Table I. When the letter "e" is 1 or more, the $R_4'$ substituent(s) are given a prime (') designation. Numbering of the pyrido benzoxazine portion of the molecule is counter clockwise starting with the nitrogen atom of the oxazine ring as the 1' position.

Spiro(indolino)naphthoxazines that may be used in the practice of the present process may be represented by the following graphic formula:

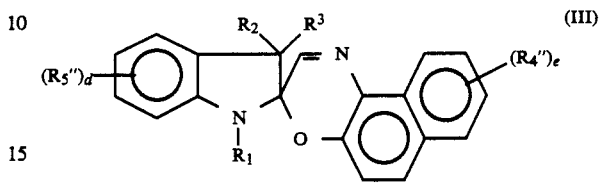

wherein $R_1$, $R_2$ and $R_3$ are the same as that described with respect to graphic formula I.

$R_4''$ in graphic formula III may be selected from the group consisting of halogen, e.g., chloro, fluoro or bromo, $C_1$-$C_5$ alkyl, $C_1$-$C_5$ alkoxy, e.g., methoxy, ethoxy, propoxy, butoxy and pentoxy, nitro, cyano, thiocyano, $C_1$-$C_4$ monohaloalkyl, e.g., $C_1$-$C_4$ monochloroalkyl, such as chloromethyl and chloroethyl, $C_1$-$C_2$ polyhaloalkyl, as for example, trihaloalkyl, such as trichloroalkyl or trifluoroalkyl, e.g., trifluoromethyl and 2,2,2-trifluoroethyl, and monoalkylamino or dialkylamino, wherein the alkyl moiety of the alkylamino group contains from 1 to 4 carbon atoms, e.g., methylamino, ethylamino, propylamino, dimethylamino and diethylamino. More particularly, the $R_4''$ substituent may be selected from the group $C_1$-$C_2$ alkyl, $C_1$-$C_2$ alkoxy, chloro, fluoro, bromo, nitro and trifluoromethyl. The letter "e" in graphic formula III is a number from 0 to 2, e.g., 1 or 2, and denotes the number of non-hydrogen substituents. When "e" is 0, all of the substituents on the available carbon atoms of the naphtho moiety of the molecule represented by formula III are hydrogen.

As in the case with graphic formula II, when "e" is 1, the $R_4''$ substituent may located on any of the available carbon atoms of the naphtho moiety of the naphthoxazine portion of the molecule, i.e., at the 5', 6', 7', 8', 9' or 10' positions. Preferably, the $R_4''$ substituent is present on the 7', 8' or 9' carbon atoms. When "e" is 2, the $R_4''$ substituents may be same or different and in either case are selected from the above-described group. When "e" is 2, the $R_4''$ substituents are commonly located at the 7' and 9' or 8' and 10' positions. Numbering of the naphthoxazine portion of the molecule is done in the same manner as that described with regard to the pyrido benzoxazine portion of the molecule of formula II.

Spiro(indolino) naphthoxazines and their synthesis are described in, for example, U.S. Pat. Nos. 3,562,172, 3,578,602 and 4,215,010. Examples of spiro(indolino) naphthoxazines selected from the description of graphic formula III that may be used in the practice of the present invention are described in Table II. Such spiro(indolino) naphthoxazines are those in which $R_1$, $R_2$, $R_3$, $R_4''$, and $R_5''$ are as indicated in Table II, the letter "d" is 0, 1 or 2 and the letter "e" is 1. As in Table I, a hyphen (-) indicates the absence of a non-hydrogen substituent. In Table II, all of the $R_4''$ substituents are at the 9'-position.

TABLE II

| Compound/ | $R_1$ | $R_2$ | $R_3$ | $R''_4$ (9'—) | $R''_5$ | $R''_5$ |
|---|---|---|---|---|---|---|
| 1 | $CH_3$ | $CH_3$ | $CH_3$ | $OCH_3$ | — | — |
| 2 | $CH_3$ | $CH_3$ | $CH_3$ | $OCH_3$ | 5-$CH_3$ | 6-$CH_3$ |
| 3 | $CH_3$ | $CH_3$ | $CH_3$ | $OCH_3$ | 5-$OCH_3$ | — |
| 4 | $CH_3$ | $CH_3$ | $CH_3$ | $OCH_3$ | 5-Cl | 6-$CH_3$ |
| 5 | $CH_3$ | $CH_3$ | $C_2H_5$ | $OCH_3$ | — | — |
| 6 | $CH_3$ | $CH_3$ | $C_2H_5$ | $OCH_3$ | 5-$CH_3$ | 6-$CH_3$ |
| 7 | $CH_3$ | $C_2H_5$ | $C_2H_5$ | $OCH_3$ | — | — |
| 8 | n-$C_4H_9$ | $CH_3$ | $C_2H_5$ | $OCH_3$ | — | — |
| 9 | $CH_3$ | $CH_3$ | phenyl | $OCH_3$ | — | — |
| 10 | $CH_3$ | phenyl | phenyl | $OCH_3$ | — | — |
| 11 | $CH_3$ | p-$C_6H_4OCH_3$ | p-$C_6H_4OCH_3$ | $OCH_3$ | — | — |
| 12 | $C_2H_5$ | $CH_3$ | $C_2H_5$ | $OCH_3$ | 5-$CH_3$ | — |
| 13 | n-$C_4H_9$ | $CH_3$ | $C_2H_5$ | $OCH_3$ | 5-$CH_3$ | — |

Compound 2 in Table II may be named 1,3,3,5,6-pentamethyl-9'-methoxyspiro [indolino-2,3' [3H]-naphth [2,1-b] [1,4]-oxazine]. Similarly, compound 6 in Table II may be named 1,3,5,6-tetramethyl-3-ethyl-9'-methoxyspiro [indolino-2,3' [3H]-naphth [2,1-b] [1,4]-oxazine]. Other compounds in Table II can be similarly named taking into account the different substituents. Moreover, compounds selected from the description of graphic formula III may be similarly named.

When the $R_5$ substituent in graphic formula I is phenylene, i.e., ortho-phenylene, or substituted phenylene, the spiro(indolino)-type compounds depicted are spiro(-benzindoline) pyridobenzoxazines ad spiro(benzindolino) naphthoxazines. Such compounds may be represented by the following graphic formula:

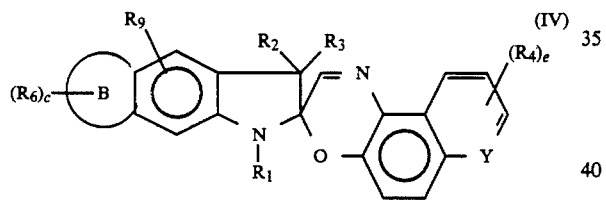

(IV)

Ring B in graphic formula IV represents a substituted or unsubstituted benzene ring fused to the six membered ring of the indolino segment of the depicted molecule. Ring B may be fused at the e, f, or g face of the indolino portion of the compound. Preferably, ring B is fused at the e or g face, as represented respectively by graphic formulae IVA and IVB:

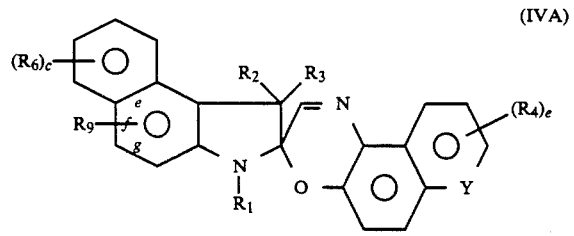

(IVA)

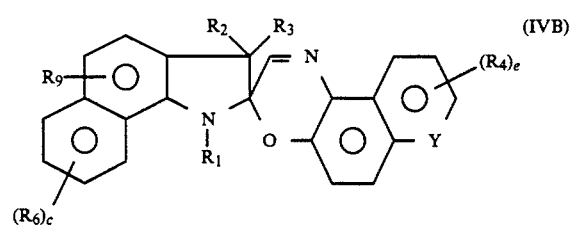

(IVB)

-continued

When ring B is fused at the e face, the compounds are numbered as depicted in graphic formula IVA'. When ring B is fused at the g face, the compounds are numbered as depicted in graphic formula IVB'.

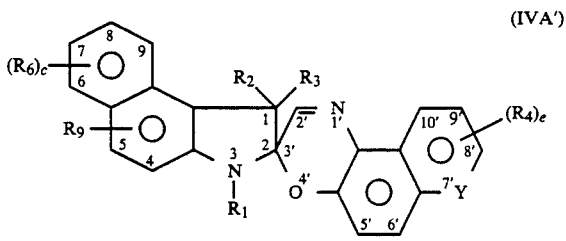

(IVA')

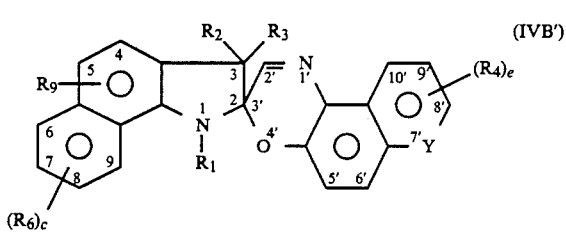

(IVB')

As with respect to the description respecting graphic formula I, Y in formula IV is carbon or nitrogen and $R_1$, $R_2$ and $R_3$ are the same as described with respect to graphic formula I.

When Y is carbon, the $R_4$ substituent(s) in graphic formula IV may be selected from the group consisting of halogen, e.g., chloro, fluoro or bromo, $C_1$-$C_5$ alkyl, $C_1$-$C_5$ alkoxy, e.g., methoxy, ethoxy, propoxy, butoxy and pentoxy, nitro, cyano, thiocyano, $C_1$-$C_4$ monohaloalkyl, e.g., $C_1$-$C_4$ monochloroalkyl such as chloromethyl and chloroethyl, $C_1$-$C_2$ polyhaloalkyl, as for example trihaloalkyl such as trichloroalkyl or trifluoroalkyl, e.g., trifluoromethyl and 2,2,2-trifluoroethyl, and monoalkylamino or dialkylamino wherein the alkyl moiety of the alkylamino group contains from 1 to 4 carbon atoms, e.g., methylamino, ethylamino, propylamino, dimethylamino and diethylamino. The letter "e" in formula IV is an integer of from 0 to 2, e.g., 1 or 2 and denotes the number of non-hydrogen substituents. In particular, when e is 1 or 2, each $R_4$ substituent may be selected from the group $C_1$-$C_2$ alkyl, $C_1$-$C_2$ alkoxy, chloro, fluoro, bromo, nitro, and trifluoromethyl.

When Y is carbon and "e" is 1, the $R_4$ substituent may be located on any of the available carbon atoms of the naphtho moiety of the naphthoxazine portion of the compound, i.e., at the 5', 6', 7', 8', 9' or 10' positions. Preferably, the $R_4$ substituent is present on the 8' or 9' carbon atoms, more usually at the 9' carbon atom. When "e" is 2, the $R_4$ substituents may be the same or different and, in either case, are selected from the above-described group. When "e" is 2, the $R_4$ substituents are commonly located at the 7' and 9' or 8' and 10' positions.

When Y is nitrogen, the $R_4$ substituent(s) may be selected from $C_1$–$C_5$ alkyl, e.g., $C_1$–$C_2$ alkyl, $C_1$–$C_5$ alkoxy, e.g., $C_1$–$C_2$ alkoxy, and halogen, e.g., chloro, fluoro or bromo. Typically, e is 0 (zero) when Y is nitrogen and thus there are no non-hydrogen substituents. When "e" is 1 and Y is nitrogen, the $R_4$ substituent may be located on any of the available carbon atoms of the pyridobenz moiety of the pyridobenzoxazine portion of the compound, i.e., at the 5', 6', 8', 9' or 10' positions, more usually at the 8', 9' or 10' positions. When "e" is 2, the $R_4$ substituent may be the same or different and, in either case, are selected from the above-described group and are located at two of aforedescribed available carbon atoms.

$R_9$ in graphic formula IV is selected from the group consisting of hydrogen, halogen, e.g., chloro, fluoro or bromo, $C_1$–$C_5$ alkyl, e.g., $C_1$–$C_2$ alkyl, $C_1$–$C_5$ alkoxy, e.g., $C_1$–$C_2$ alkoxy, $C_1$–$C_4$ monohaloalkyl. e.g., $C_1$–$C_2$ monohaloalkyl such as chloromethyl, chloroethyl and fluoromethyl, $C_1$–$C_2$ polyhaloalkyl, as for example trihaloalkyl such as trichloroalkyl or trifluoroalkyl, e.g., trifluoromethyl, cyano and $C_1$–$C_8$ alkoxycarbonyl. The $R_9'$ substituent may be located at either the number 4 or 5 carbon atom positions.

$R_6$ in graphic formula IV is selected from the group consisting of halogen, e.g., chloro, fluoro or bromo, $C_1$–$C_5$ alkyl, e.g., $C_1$–$C_2$ alkyl, $C_1$–$C_5$ alkoxy, e.g., $C_1$–$C_2$ alkoxy, cyano, $C_1$–$C_8$ alkoxycarbonyl, $C_1$–$C_2$ polyhaloalkyl, $C_1$–$C_4$ monohaloalkyl and monoalkylamino or dialkylamino wherein the alkyl moiety of the alkylamino group contains from 1 to 4 carbon atoms, e.g., methylamino, ethylamino, propylamino and diethylamino.

The letter "c" in formula IV is an integer of from 0 to 2, e.g., 0 or 1, more typically 0. When there are substituents on the benz moiety of the benzindoline portion of the depicted molecule and the letter "c" is 1 or 2, it denotes the number of non-hydrogen substituents. When "c" is 1, the $R_6$ substituent may be located at the number 6, 7 or 8 carbon atoms. Similarly, when "c" is 2, the $R_6$ substituents may be present at the 6 and 7, 6 and 8, or 7 and 8 carbon atoms.

Of particular interest, are photochromic materials represented by graphic formulae IVA and IVB wherein Y is nitrogen; $R_1$ is a $C_1$–$C_4$ alkyl, such as methyl, ethyl, n-propyl, isopropyl, n-butyl, secondary butyl, isobutyl and tertiary butyl; $R_2$ and $R_3$ are each methyl, ethyl or phenyl; $R_4$ is selected from $C_1$–$C_4$ alkyl, $C_1$–$C_4$ alkoxy, chloro, fluoro or cyano; $R_9$ is selected from hydrogen, fluoro, trifluoromethyl and $C_1$–$C_4$ alkyl; $R_6$ is selected from $C_1$–$C_4$ alkyl, $C_1$–$C_4$ alkoxy, chloro, fluoro and $C_1$–$C_4$ monoalkylamino or dialkylamino; "c" is 0 or 1; and "e" is 0 or 1.

Examples of contemplated compounds within the scope of graphic formulae IVA and IVB are listed in Tables III and IV. In Table III, Y is carbon. In Table IV, Y is nitrogen. Compound 1 of Table III may be named: 9'-methoxy-1,3,3-trimethylspiro [benz[e] indolino-2,3'[3H] naphth [2,1-b] [1,4] oxazine]. Other compounds in Table III and the compounds of Table IV may be similarly named as substituted spiro benz(indolino) naphthoxazines or spiro benz(indolino) pyrido benzoxazines using the substituents described in the Tables for such compounds or the substituents described with respect to graphic formula IV. In naming such compounds herein, the IUPAC rules of organic nomenclature have been used. Carbon atom numbering in the compounds is in accordance with the numbering sequence illustrated in graphic formulae IVA' and IVB'. A hyphen (-) indicates the absence of a non-hydrogen substituent.

TABLE III

| Compound/ | $R_1$ | $R_2$ | $R_3$ | $R_4$ | $R_9$ | $R_6$ | Face |
|---|---|---|---|---|---|---|---|
| 1 | Me | Me | Me | 9'-OMe | — | — | e |
| 2 | Me | Me | Me | 9'-OMe | — | — | g |
| 3 | Et | Me | Me | 9'-OMe | — | — | e |
| 4 | n-Pr | Me | Me | 9'-OMe | — | — | e |
| 5 | i-Pr | Me | Me | 9'-OMe | — | — | e |
| 6 | Et | Me | Me | 9'-OMe | — | — | g |
| 7 | n-Pr | Me | Me | 9'-OMe | — | — | g |
| 8 | Me | Me | Me | 9'-OMe | 5-F | — | e |
| 9 | Me | Me | Me | 9'-OMe | 5-$CF_3$ | — | e |
| 10 | Me | Me | Me | 9'-OMe | 5-F | — | g |
| 11 | Me | Me | Me | 9'-OMe | 5-$CF_3$ | — | g |
| 12 | Me | Me | Ph | 9'-OMe | — | 7-Cl | g |
| 13 | Me | Me | Me | $(OMe)_2$ | 5-OMe | — | g |
| 14 | Et | Me | Me | 6'-$NEt_2$ | — | OMe | e |
| 15 | Me | Me | Me | 9'-OMe | 5-Me | 6-Me | g |
| 16 | Me | Me | Me | 9'-Me | 5-Me | 6-Me | e |
| 17 | Me | Me | Me | 8'-$NO_2$ | 5-$CF_3$ | — | g |
| 18 | Me | Me | Me | 8'-Cl | — | — | e |
| 19 | i-Pr | Me | Me | 8'-$CF_3$ | — | — | e |
| 20 | Me | Me | Me | 8'-ClMe | 5-$CF_3$ | — | g |
| 21 | Me | Me | Me | 9'-OMe | 5-AcO | — | g |
| 22 | Me | Me | Me | 9'-OMe | 5-ClMe | 7-Cl | e |
| 23 | Me | Me | Me | — | — | — | e or g |
| 24 | Me | Me | Me | 9'-OEt | — | — | e or g |
| 25 | Me | Me | Me | 8'-Br | — | — | e or g |
| 26 | $(CH_2)_2CN$ | Me | Me | 9'-OMe | — | — | e or g |
| 27 | $(CH_2)_2COOH$ | Me | Me | 9'-OMe | — | — | e or g |
| 28 | $(CH_2)_2OH$ | Me | Me | 9'-OMe | — | — | e or g |
| 29 | Me | Me | Me | 9'-OMe | — | 7-$CF_3$ | e |

TABLE III-continued

| Compound/ | R₁ | SUBSTITUENT (Y = C) | | | | | Face |
| | | R₂ | R₃ | R₄ | R₉ | R₆ | |
|---|---|---|---|---|---|---|---|
| 30 | (CH₂)₂OCH₃ | Me | Me | 9'-OMe | — | — | e |

TABLE IV

| Compound/ | R₁ | SUBSTITUENT (Y = N) | | | | | Face |
| | | R₂ | R₃ | R₄ | R₉ | R₆ | |
|---|---|---|---|---|---|---|---|
| 1 | Me | Me | Me | — | — | — | e |
| 2 | Me | Me | Me | — | — | — | g |
| 3 | Me | Me | Me | 6'-Me | — | — | e or g |
| 4 | Me | Me | Me | 6'-OMe | — | — | e or g |
| 5 | Me | Me | Me | 6'-Cl | — | — | e or g |
| 6 | Me | Me | Me | — | 5-F | — | e or g |
| 7 | Me | Me | Me | — | 5-CF₃ | — | e or g |
| 8 | Et | Me | Me | — | — | — | e or g |
| 9 | n-Pr | Me | Me | — | — | — | e or g |
| 10 | i-Pr | Me | Me | — | — | — | e |
| 11 | Me | Me | Et | 6'-Me | 5-CF₃ | 7-F | g |
| 12 | Me | Me | Me | 6'-OMe | 5-Me | 6-Me | g |
| 13 | Me | Me | Et | 6'-OMe | — | 6-OMe | g |
| 14 | Me | Me | Me | 6'-OMe | 5-F | 6-NEt₂ | g |
| 15 | Me | Me | Et | 6'-F | 5-F | 6-Me | g |
| 16 | Me | Me | Me | 6'-Me | — | — | e or g |
| 17 | (CH₂)₂CN | Me | Me | — | — | — | e or g |
| 18 | (CH₂)₂COOH | Me | Me | — | — | — | e or g |
| 19 | (CH₂)₂OH | Me | Me | — | — | — | e or g |
| 20 | Me | Me | Me | — | — | 7-CF₃ | e or g |
| 21 | Me | Me | Me | — | — | 7-F | e or g |

Key For Tables:
Me = methyl Ph = phenyl CF₃ = trifluoromethyl
Et = ethyl OMe = methoxy ClMe = chloromethyl
n-Pr = n-propyl NO₂ = nitro Cl = chlorine
i-Pr = isopropyl NEt₂ = diethylamino F = fluorine
(CH₂)₂CN = cyanoethyl (CH₂)₂OH = hydroxyethyl AcO = acetoxy
(CH₂)₂COOH = carboxyethyl (CH₂)₂OCH₃ = methoxyethyl The described photochromic substances of Group I may be synthesized by reaction of the corresponding $(R_5)_d$-substituted indoline (Fischer's base) or indolium salt, e.g., the iodide salt, with the corresponding $(R_4)_e$-substituted-1-nitroso-2-naphthol or $(R_4)_e$- substituted-5-nitroso-6-quinolinol.

Photochromic substances represented by graphic formula IV are the subject of co-pending, co-assigned U.S. Pat. application Ser. No. 78,325, filed July 27, 1987. That application, and particularly the methods described therein for preparing the aforesaid compounds, is incorporated herein by reference.

Photochromic substances that have at least one activated absorption maximum between about 400 and less than 590 nanometers include spiro(indolino) benzoxazine compounds that may be represented by the following graphic formula V:

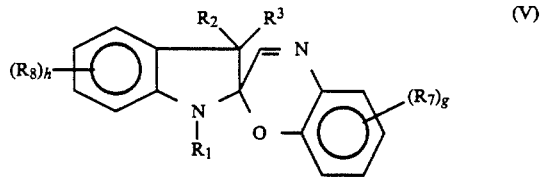

(V)

In the above graphic formula V, $R_1$, $R_2$ and $R_3$ are the same as that described with respect to graphic formula I.

$R_8$ in graphic formula V may be selected from the group consisting of $C_1$–$C_5$ alkyl, halogen, e.g., chloro and fluoro, $C_1$–$C_5$ alkoxy, nitro, cyano, $C_1$–$C_4$ monohaloalkyl, $C_1$–$C_4$ polyhaloalkyl, e.g., trihaloalkyl, $C_1$–$C_8$ alkoxycarbonyl, and $C_1$–$C_4$ acyloxy, e.g., acetoxy. While any halogen, i.e., chlorine, bromine, iodine and fluorine, may be used in respect to the halogen or halo- alkyl substituents, chlorine, fluorine and bromine, especially chlorine and fluorine is preferred for the halogen substituent and fluorine is preferred for the polyhaloalkyl substituent, e.g., trifluoromethyl ($CF_3$) Preferably, $R_8$ may be selected from the group consisting of $C_1$–$C_2$ alkyl, chlorine, fluorine, $C_1$–$C_2$ trihaloalkyl, e.g., trihalomethyl such as trifluoromethyl, and $C_1$–$C_5$ alkoxy.

The letter "h" in formula V is an integer from 0 to 4, e.g., 0 to 2, such as 1 or 2. When "h" is 2 or more, the $R_8$ substituents may be the same or different and in either case are selected from the aforedescribed group. The $R_8$ substituents(s) may be located on any of the available carbon atoms of the indolino portion of the compound, i.e., at the 4', 5', 6', or 7' positions. When "h" is 2, the $R_8$ substituents may be present at the 4' and 5', 5' and 6', 4'and 7', 6'and 7 ' carbon atoms of the indolino moiety.

As described with respect to graphic formulae II and III, it is possible that the photochromic organic compounds represented by graphic formula V may be a mixture of isomers due to the alternative directional mechanism by which intramolecular condensation occurs during formation of the starting indole reactant (Fischer's base). That discussion is equally applicable to compounds of graphic formula V and is incorporated herein by reference.

$R_7$ in graphic formula V is selected from the group consisting of halogen, e.g., chloro, fluoro, or bromo, $C_1$–$C_4$ alkyl, $C_1$–$C_5$ alkoxy, nitro, cyano, thiocyano, $C_1$–$C_4$ monohaloalkyl, e.g., chloromethyl and chloroethyl, $C_1$–$C_2$ polyhaloalkyl, e.g., trihaloalkyl, such as trifluoromethyl and 2,2,2-trifluoroethyl, and monoalkylamino or dialkylamino wherein the alkyl moiety of the alkylamino group contains from 1 to 4 carbon atoms, e.g., methylamino, dimethylamino and diethylamino. The letter "g" in formula V is an integer of from 1 to 4, usually, 1, 2, or 3, and preferably is 1 or 2. In particular, $R_7$ is $C_1$-$C_2$ alkyl, $C_1$-$C_2$ alkoxy, chloro, bromo, nitro, or trifluoromethyl.

The $R_7$ substituent (when "g" is 1) may be located on any of the available carbon atoms of the benzene ring of the benzoxazine moiety of the compound, i.e., at the 5, 6, 7 or 8 positions. Preferably, the $R_7$ substituent is present on the 5, 6, or 7 carbon atoms of the benzene ring of the benzoxazine moiety. When "g" is 2 or more, the $R_7$ substituents may be the same or different and in either case are selected from the above-described group. When "g" is 2, the $R_7$ substituents may be located at the 5 and 6, 5 and 7, 5 and 8, 6 and 7, 7 and 8 or 6 and 8 positions; preferably at the 5 and 7 positions. When "g" is 3, the $R_7$ substituents may be located at the 5, 6, and 7; 5, 7, and 8; 6, 7, and 8; or 5, 6, and 8 positions.

Of particular interest, are photochromic materials represented by graphic formula V wherein $R_1$ is a $C_1$-$C_4$ alkyl, such as methyl, ethyl, n-propyl, isopropyl, n-butyl, secondary butyl, isobutyl and tertiary butyl; $R_2$ and $R_3$ are each methyl, ethyl or phenyl; $R_8$ is selected from trifluoromethyl, chlorine, fluorine, methyl or methoxy; $R_7$ is selected from methoxy, methyl, nitro, fluoro, bromo or chloro, "h" is 1 or 2, and "g" is 1 or 2.

Examples of contemplated compounds within the scope of graphic formula V are listed in Table V. The prime (') designations for the $R_8$ substituent positions in Table V have been omitted. A hyphen (-) indicates the absence of a non-hydrogen substituent. Compound 1 may be named: 7-methoxy-1',3',3',4' (and 6'). 5'-pentamethylspiro[2H-1,4-benzoxazine-2,2'-indoline]. Compounds 2-44 may be similarly named as substituted spiro(indolino) benzoxazines using the substituents described in Table V for such compounds. In naming the spiro(indoline)benzoxazines, the IUPAC rules of organic nomenclature have been used. The positions on the indoline portion of the molecule have been numbered counterclockwise starting with the nitrogen atom as number one (1), and are identified by a prime number, e.g., 3'. The positions on the benzoxazine portion of the molecule have been numbered clockwise starting with the oxygen atom as number one (1).

TABLE V

| Compound/ | $R_1$ | $R_2$ | $R_3$ | $R_8$ | $R_8$ | $R_7$ | $R_7$ |
|---|---|---|---|---|---|---|---|
| 1 | Me | Me | Me | 4(6)-Me | 5-Me | 7-OMe | — |
| 2 | Me | Me | Me | 4(6)-Me | 5-Me | 7-OMe | 5-OMe |
| 3 | Me | Me | Me | 5-OMe | — | 7-OMe | 5-OMe |
| 4 | Me | Me | Me | 4(6)-Me | 5-Me | 7-OMe | 5-Cl |
| 5 | Me | Me | Me | 4(6)-Me | 5-Me | 6-NO$_2$ | — |
| 6 | Me | Me | Me | 4(6)-Me | 5-Me | 6-Cl | — |
| 7 | Me | Me | Ph | — | — | 7-OMe | — |
| 8 | Me | Me | Et | — | — | 7-OMe | 5-OMe |
| 9 | n-Bu | Me | Me | — | — | 7-OMe | 5-OMe |
| 10 | Me | Cyclohexyl | | — | — | 7-OMe | 5-OMe |
| 11 | Me | Me | Me | 5-OMe | — | 6-NO$_2$ | — |
| 12 | Me | Me | Me | 5-OMe | — | 6-NO$_2$ | 8-OMe |
| 13 | Et | Me | Me | 5-OMe | — | 6-NO$_2$ | 8-OMe |
| 14 | Me | Me | Et | 4(6)-Me | 5-Me | 6-NO$_2$ | 8-OMe |
| 15 | Me | Me | Ph | — | — | 6-NO$_2$ | 8-OMe |
| 16 | Me | Me | Me | 4(6)-Me | 5-Me | 8-NO$_2$ | 6-OMe |
| 17 | Me | Me | Me | — | — | 8-NO$_2$ | 6-OMe |
| 18 | Me | Me | Me | 5-OMe | — | 8-NO$_2$ | 6-OMe |
| 19 | Et | Me | Me | — | — | 7-OMe | 6-Br |
| 20 | Me | Me | Et | 4(6)-Me | 5-Me | 7-OMe | 5-Me |
| 21 | i-Pr | Me | Me | 5-OMe | — | 7-OMe | 5-OMe |
| 22 | Me | Me | Me | — | — | 7-NEt$_2$ | — |
| 23 | Benzyl | Me | Me | — | — | 7-NO$_2$ | — |
| 24 | Me | Me | Me | 4(6)-F | — | 7-OMe | 5-OMe |
| 25 | Me | Me | Me | 6-Cl | — | 7-OMe | 5-OMe |
| 26 | Me | Me | Me | 7-F | — | 7-OMe | 5-OMe |
| 27 | Me | Me | Me | 7-Cl | — | 7-OMe | 5-OMe |
| 28 | Me | Me | Me | 7-Br | — | 7-OMe | 5-OMe |
| 29 | Me | Me | Me | 5-F | — | 7-OMe | 5-OMe |
| 30 | Me | Me | Me | 5-Cl | — | 7-OMe | 5-OMe |
| 31 | Me | Me | Me | 5-OMe | — | 7-OMe | 5-OMe |
| 32 | Me | Me | Me | 5-OMe | — | 7-OMe | — |
| 33 | Me | Me | Me | 6-CF$_3$ | — | 7-OMe | 5-OMe |
| 34 | Me | Me | Et | 4(6)-F | — | 7-OMe | 5-OMe |
| 35 | Me | Me | Me | 4(6)AcO | — | 7-OMe | 5-OMe |
| 36 | Me | Me | Me | 4(6)CF$_3$ | — | 7-OMe | 5-OMe |
| 37 | Me | Me | Me | 4(6)F | 5-F | 7-OMe | 5-OMe |
| 38 | Me | Me | Me | 4(6)Cl | 5-Cl | 7-OMe | 5-OMe |
| 39 | Me | Me | Me | 4(6)F | — | 7-OMe | 5-Cl |
| 40 | Me | Me | Me | 4(6)F | — | 7-OMe | 5-F |
| 41 | Me | Me | Me | 4(6)AcO | — | 7-OMe | 5-OMe |
| 42 | Me | Me | Me | — | 5-AcO | 7-OMe | 5-OMe |
| 43 | Me | Me | Me | 4(6)AcO | 5-F | 7-OMe | 5-OMe |
| 44 | Me | Me | Me | 4(6)AcO | 5-Cl | 7-OMe | 5-OMe |
| 45 | CNEt | Me | Me | — | — | 7-OMe | 5-OMe |

TABLE V-continued

| Compound/ | R₁ | R₂ | R₃ | R₈ | R₈ | R₇ | R₇ |
|---|---|---|---|---|---|---|---|
| | | | | SUBSTITUENT | | | |
| 46 | Me | Me | Et | 5-Cl | 6 Me | 7-OMe | 5-OMe |

Key:
Me = methyl Ph = phenyl Br = bromine
n-Bu = n-butyl OMe = methoxy Cl = chlorine
Et = ethyl NO₂ = nitro F = fluorine
i-Pr = isopropyl NEt₂ = diethylamino AcO = acetoxy
CNEt = cyanoethyl The photochromic substances or compositions described herein may be dissolved in common organic solvents such as benzene, toluene, chloroform, ethylacetate, methyl ethyl ketone, acetone, ethyl alcohol, methyl alcohol, acetonitrile, tetrahydrofuran, dioxane, methyl ether of ethylene glycol, dimethylformamide, dimethylsulfoxide, methyl Cellosolve, morpholine and ethylene glycol. They may also be dispersed in liquids containing water and/or alcohols.

The photochromic substances or compositions used in the practice of the present invention may also be dissolved in colorless or transparent solutions prepared from transparent organic host materials, e.g., transparent polymers (or copolymers) or blends of such transparent polymers and optionally a suitable organic solvent, e.g., polymers of transparent organic host materials described hereinafter dissolved in one or more of the aforesaid described organic solvents. Examples of such solutions include a poly(vinyl acetate)-acetone solution, a nitrocellulose-acetonitrile solution, a poly(vinyl chloride)-methyl ethyl ketone solution, a poly(methyl methacrylate)-acetone solution, a cellulose acetate-dimethylformamide solution, a poly(vinyl pyrrolidone)acetonitrile solution, a polystyrene-benzene solution and an ethyl cellulose-methylene chloride solution. The aforesaid photochromic solutions or compositions may be applied to a compatible host material, e.g., a transparent support, such as cellulose triacetate, polyethylene terephthalate or baryta paper and dried to obtain an article that may be color formed by ultraviolet radiation and returned to colorless by removing the source of ultraviolet radiation.

The photochromic substances described herein (or compositions containing them) may be applied to or incorporated within a coating composition applied to a compatible support; or applied to or incorporated within the article comprising the compatible host, e.g., a polymerized organic material such as a synthetic polymeric plastic host material.

The polymer host material will usually be transparent, but may be translucent or even opaque. The polymer product need only be transparent to that portion of the electromagnetic spectrum, which activates the photochromic substance, i.e., that wavelength of ultraviolet (UV) light that produces the open form of the substance and that portion of the visible spectrum that includes the absorption maximum wavelength of the substance in its UV activated form, i.e., the open form. Further, the resin color should not be such that it masks the color of the activated form of the photochromic substance, i.e., so the change in color is readily apparent to the observer.

Preferably, the host material article is a solid transparent material or an optically clear material, e.g., materials suitable for ophthalmic elements, such as ophthalmic lenses, or materials useful for applications such as windows, windshields, aircraft transparencies, etc. A host material containing the photochromic substances described in connection with the present invention can be used in the preparation of photochromic plastic films, sheets and lenses, such as lenses for sunglasses, ski goggles, visors, camera lenses and variable density filters. As used herein, the term "optical element" is meant to include lenses and transparencies. The photochromic substances or compositions described herein also may be incorporated into coatings such as paints, inks, etc. by admixing the material with the fluid coating composition before it is applied to the host surface and dried.

Examples of host materials which may be used with the photochromic substances or compositions described herein include: homopolymers and copolymers of polyol(allyl carbonate) monomers, homopolymers and copolymers of polyfunctional acrylate monomers, polyacrylates, poly(alkylacrylates) such as poly(methyl methacrylate), cellulose acetate, cellulose triacetate, cellulose acetate propionate, cellulose acetate butyrate, poly(vinyl acetate), poly(vinyl alcohol), poly(vinyl chloride), poly(vinylidene chloride), polyurethanes, polycarbonates, poly(ethylene terephthalate), polystyrene, copoly(styrene-methyl methacrylate) copoly(styrene-acrylonitrile), polyvinylbutyral and homocopolymers and copolymers of diallylidene pentaerythritol, particularly copolymers with polyol (allyl carbonate) monomers, e.g., diethylene glycol bis(allyl carbonate), and acrylate monomers. Transparent copolymers and blends of the transparent polymers are also suitable as host materials. Preferably, the host material is an optically clear polymerized organic material prepared from a polycarbonate resin, such as the carbonate-linked resin derived from bisphenol A and phosgene, which is sold under the trademark, LEXAN; a poly(methyl methacrylate), such as the material sold under the trademark, PLEXIGLAS: polymerizates of a polyol(allyl carbonate), especially diethylene glycol bis(allyl carbonate), which monomer is sold under the trademark CR-39, and its copolymers with for example vinyl acetate, e.g., copolymers of from 80-90 percent diethylene glycol bis(allyl carbonate) and 10-20 percent vinyl acetate; particularly 80-85 percent of the bis(allyl carbonate) and 15-20 percent vinyl acetate, cellulose acetate, cellulose propionate, cellulose butyrate, polystyrene and its copolymers with methyl methacrylate, vinyl acetate and acrylonitrile, and cellulose acetate butyrate.

Polyol (allyl carbonate) monomers which can be polymerized to form a transparent host material are the allyl carbonates of linear or branched aliphatic or aromatic liquid polyols, e.g., aliphatic glycol bis(allyl carbonate) compounds, or alkylidene bisphenol bis(allyl carbonate) compounds. These monomers can be described as unsaturated polycarbonates of polyols, e.g., glycols. The monomers can be prepared by procedures well known in the art, e.g., U.S. Pat. Nos. 2,370,567 and 2,403,113.

The polyol (allyl carbonate) monomers can be represented by the graphic formula:

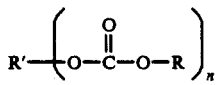

wherein R is the radical derived from an unsaturated alcohol and is commonly an allyl or substituted allyl group, R' is the radical derived from the polyol, and n is a whole number from 2-5, preferably 2. The allyl group (R) can be substituted at the 2 position with a halogen, most notably chlorine or bromine, or an alkyl group containing from 1 to 4 carbon atoms, generally a methyl or ethyl group. The R group can be represented by the graphic formula:

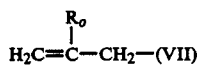

wherein $R_o$ is hydrogen, halogen, or a $C_1$–$C_4$ alkyl group. Specific examples of R include the groups: allyl, 2-chloroallyl, 2-bromoallyl, 2-fluoroallyl, 2-methallyl, 2-ethylallyl, 2-isopropylallyl, 2-n-propylallyl, and 2-n-butylallyl. Most commonly R is the allyl group, $H_2C=CH-CH_2-$.

R' is a polyvalent radical derived from the polyol, which can be an aliphatic or aromatic polyol that contains 2, 3, 4 or 5 hydroxy groups. Typically, the polyol contains 2 hydroxy groups, i.e., a glycol or bisphenol. The aliphatic polyol can be linear or branched and contain from 2 to 10 carbon atoms. Commonly, the aliphatic polyol is an alkylene glycol having from 2 to 4 carbon atoms or a poly($C_2$–$C_4$) alkylene glycol, i.e., ethylene glycol, propylene glycol, trimethylene glycol, tetramethylene glycol, or diethylene glycol, triethylene glycol, etc.

The aromatic polyol can be represented by the graphic formula:

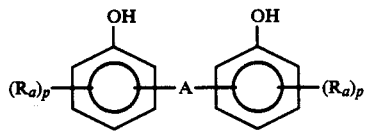

wherein A is a bivalent radical derived from an acyclic aliphatic hydrocarbon, e.g., an alkylene or alkylidene radical, having from 1 to 4 carbon atoms, e.g., methylene, ethylene, and dimethylmethylene (isopropylidene:), Ra represents lower alkyl substituents of from 1 to 3 carbon atoms and halogen, e.g., chlorine and bromine, and p is 0, 1, 2, or 3. Preferably, the hydroxyl group is in the ortho or para position.

Specific examples of the radical R' include: alkylene groups containing from 2 to 10 carbon atoms such as ethylene, ($-CH_2-CH_2-$), trimethylene, methylethylene, tetramethylene, ethylethylene, pentamethylene, hexamethylene, 2-methylhexamethylene, octamethylene, and decamethylene; alkylene ether groups such as $-CH_2-O-CH_2-$, $-CH_2CH_2-O-CH_2CH_2-$, $-CH_2-)-CH-CH-$, and $-CHCH-CH-)-CHCHCH-$; alkylene polyether groups such as $-CH_2CH_2-O-CH_2CH_2-O-CH_2CH_2-$, and $-CH_2CH_2CH_2-O-CH_2CH_2CH_2-O-CH_2CH_2CH_2-$; alkylene carbonate and alkylene ether carbonate groups such as $-CH_2CH_2-O-CO-O-CH_2CH_2-$ and $-CH_2CH_2-O-CH_2CH_2-O-CO-O-CH_2CH_2CH_2-$; and isopropylidene bis(para-phenyl), i.e., 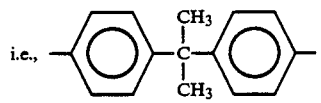

Most commonly, R' is $-CH_2CH_2-$, $-CH_2CH_2-O-CH_2CH_2-$, or $-CH_2CH_2-O-CH_2CH_2-O-CH_2Ch_2-$.

Specific examples of polyol (allyl carbonate) monomers include ethylene glycol bis(2-chloroallyl carbonate), ethylene glycol bis(allyl carbonate), diethylene glycol bis(2-methallyl carbonate), diethylene glycol bis(allyl carbonate), triethylene glycol bis(allyl carbonate), propylene glycol bis(2-ethylallyl carbonate), 1,3-propanediol bis(allyl carbonate), 1,3-butanediol bis(allyl carbonate), 1,4-butanediol bis(2-bromoallyl carbonate), dipropylene glycol bis(allyl carbonate), trimethylene glycol bis(2-ethylallyl carbonate), pentamethylene glycol bis(allyl carbonate), and isopropylidene bisphenol bis(allyl carbonate).

Industrially important polyol bis(allyl carbonate) monomers which can be utilized in the invention herein contemplated are:

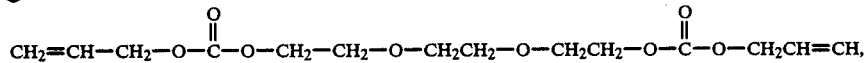

Triethylene Glycol bis(Allyl Carbonate)

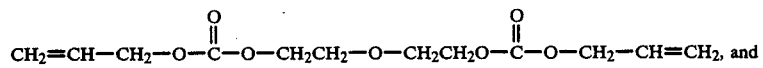

Diethylene Glycol bis(Allyl Carbonate)

Ethylene Glycol bis(Allyl Carbonate)

Diethylene glycol bis(allyl carbonate) is preferred.

Because of the process by which the polyol(allyl carbonate) monomer is prepared, i.e., by phosgenation of the polyol (or allyl alcohol) and subsequent esterification by the allyl alcohol (or polyol), the monomer product can contain related monomer species in which the moiety connecting the allyl carbonate groups contains one or more carbonate groups. These related monomer species can be represented by the graphic formula:

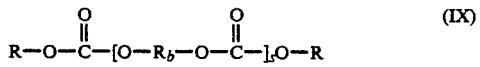

$$R-O-\overset{O}{\underset{\|}{C}}-[O-R_b-O-\overset{O}{\underset{\|}{C}}-]_sO-R \quad \text{(IX)}$$

wherein R is as defined above, $R_b$ is a bivalent radical, e.g., alkylene or phenylene, derived from a diol, and s is a whole number from 2 to 5. The related monomer species of diethylene glycol bis(allyl carbonate) can be represented by the graphic formula,

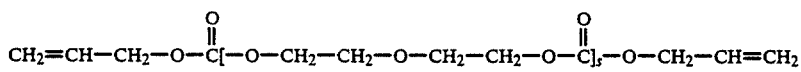

$$CH_2=CH-CH_2-O-\overset{O}{\underset{\|}{C}}[-O-CH_2-CH_2-O-CH_2-CH_2-O-\overset{O}{\underset{\|}{C}}]_s-O-CH_2-CH=CH_2$$

wherein s is a whole number from 2 to 5. The polyol (allyl carbonate) monomer can typically contain from 2 to 20 weight percent of the related monomer species and such related monomer species can be present as mixtures, i.e., mixtures of the species represented by s being equal to 2, 3, 4 etc.

In addition, a partially polymerized form of the polyol (allyl carbonate) monomer, i.e., prepolymer, can be used. In that embodiment, the monomer is thickened by heating or partially polymerized by using small, e.g., 0.5–1.5 parts of initiator per hundred parts of monomer (phm), to provide a non-gel containing, more viscous monomeric material.

As used in the present description and claims, the term polyol(allyl carbonate) monomer or like names, e.g., diethylene glycol bis(allyl carbonate), are intended to mean and include the named monomer or prepolymer and any related monomer species contained therein.

Polyfunctional acrylate monomers that may be used to prepare synthetic polymeric host materials are esterification products of an acrylic acid moiety selected from the group consisting of acrylic acid and methacrylic acid, and a polyol, e.g., a diol, a triol or tetracarbinol. More particularly, the polyfunctional acrylate monomer may be represented by the following graphic formula:

$$(CH_2=C(R_t)-C(O))_nR'' \quad \text{(XI)}$$

wherein $R_t$ is hydrogen or methyl, n is the number 2, 3, or 4, and R" is the multivalent radical, i.e., a bivalent, trivalent or quadravalent radical, remaining after removal of the hydroxy groups from a polyol, having from 2 to 4 hydroxy groups, e.g., a diol, a triol or tetracarbinol respectively. More particularly, $R_t$ is hydrogen or methyl, and n is 2 or 3, more usually 2.

R" may be selected from the group consisting of alpha, omega $C_2-C_8$ glycols, cyclohexane diol, diethylene glycol, triethylene glycol, tetraethylene glycol, dipropylene glycol, $C_2-C_5$ triols and pentaerythritol. Examples of such polyols include ethylene glycol, trimethylene glycol, 1,4-butane diol, 1,5-pentane diol, 1,6-hexane diol, propylene glycol, trimethylol propane, glycerol and the like.

Examples of polyfunctional acrylate monomers, such as diacrylates and triacrylates, include: ethylene glycol diacrylate, ethylene glycol dimathyacrylate, 1,2-propane diol diacrylate, 1,3-propane diol diacrylate, 1,2-propane diol dimethacrylate, 1,3-propane diol dimethacrylate, 1,4-butane diol diacrylate, 1,3-butane diol dimethyacrylate, 1,4-butane diol dimethacrylate, 1,5-pentane diol diacrylate, 2,5-dimethyl-1,6-hexane diol dimethacrylate, diethylene glycol diacrylate, diethylene glycol dimethacrylate, triethylene glycol dimethacrylate, trimethylol propane trimethacrylate, tetraethylene glycol diacrylate, tetraethylene glycol dimethacrylate, dipropylene glycol diacrylate, dipropylene glycol dimethacrylate, trimethylol propane triacrylate, glycerol triacrylate, glycerol trimethacrylate, pentaerythritol triacrylate, pentaerythritol dimethacrylate, pentaerythritol tetraacrylate, pentaerythritol tetramethacrylate and mixtures of such acrylate monomers.

A portion of the polyfunctional acrylate monomer may be replaced with a monofunctional copolymerizable monomer containing the vinyl ($CH_2=CH-$) grouping. Such compatible monomers include monofunctional acrylic and methacrylic acid esters, and vinyl esters of $C_2-C_6$ carboxylic acids, i.e., vinyl carboxylates. Preferably, the copolymerizable monomer is a non-aromatic, e.g., non-benzenoid, containing monomer. Monofunctional acrylic or methacrylic ester monomers may be graphically illustrated by the following formula, $$CH_2=C(R_t)-C(O)-O-R''' \quad \text{(XII)}$$

wherein $R_t$ is hydrogen or methyl, and R''' is selected from the group consisting of $C_1-C_{12}$, e.g., $C_1-C_8$, alkyl, $C_5-C_6$ cycloalkyl, glycidyl and hydroxyethyl. Preferably, R''' is a a $C_1-C_4$ alkyl, e.g., methyl or cyclohexyl.

Examples of monofunctional acrylic acid type monomers include, for example, the acrylic and methacrylic acid esters of alkanols such as methanol, ethanol, propanol, butanol, pentanol, hexanol, heptanol and octanol, e.g., methyl acrylate, methyl methacrylate, ethyl acrylate and ethyl methacrylate, cycloalkanols such as cyclopentanol and cyclohexanol, glycidol (3-hydroxy propylene oxide, (d, l, dl)) and ethylene glycol. Examples of vinyl carboxylates include vinyl acetate, vinyl propionate, vinyl butyrate and vinyl valerate. In addition to and/or in place of the aforedescribed monofunctional copolymerizable monomer, monofunctional allylic and difunctional allylic copolymerizable compatible monomers may also replace a portion of the polyfunctional acrylate monomer. Monofunctional allylic monomers contemplated include allyl esters of $C_2-C_6$ carboxylic acids, $C_1-C_6$ allyl ethers and other copolymerizable allyl compounds. Preferably the monofunctional allylic monomer is a non-aromatic compound. Difunctional allylic copolymerizable monomers contemplated herein are the polyol (allyl carbonates) monomers of graphic formula VI.

The amount of photochromic substance or composition-containing same applied to or incorporated into a host material is not critical Provided that a sufficient amount is used to produce a photochromic effect discernible to the naked eye. Generally such amount can be described as a photochromic amount. The amount used depends often upon the intensity of color desired upon irradiation thereof and upon the method used to incorporate or apply the photochromic substances. Typically, the more compound applied or incorporated, the greater is the color intensity. Usually, the amount of each photochromic substance incorporated into or applied to the host material ranges from about 0.01 to about 20 percent by weight, more usually from about 0.05 to about 10 percent by weight, based on the weight of the host material. Stated another way, the amount of each photochromic substance used to impart a photochromic effect will typically vary from about 0.1 to about 10, e.g., 0.5 to 2 milligrams of the photochromic substance per square inch of the surface of the host material independent of the thickness of the host material article. Hence, the photochromic substance is present in higher concentrations in thin samples, films, or coatings, and in lower concentrations in thick samples.

The present invention is more particularly described in the following examples which are intended as illustrative only, since numerous modifications and variations therein will be apparent to those skilled in the art.

EXAMPLE 1

A mixture of photochromic substances was prepared by combining 0.0102 grams of 9'-methoxy-1,3,3-trimethylspiro[benz[g]indolino-2,3'[3H] naphth [2,1-b][1,4] oxazine] and 0.0886 grams of 5,7-dimethoxy-1',3'-dimethyl-3'-ethyl-4'(and 6') fluorospiro[2H-1,4-benzoxazine-2,2'-indoline] with 1.0 milliliters of diglyme to form a solution of the aforesaid photochromic substances. This solution was placed in a vial and a 1 square centimeter sample of a slightly undercured polymer of diethylene glycol bis(allyl carbonate) was immersed in the solution. The vial was placed in an oven maintained at about 100° C. for about 90 minutes. The plastic sample was removed from the vial and rinsed with methyl ethyl ketone. The dried plastic test sample was irradiated with 365 nanometer ultraviolet light and the sample changed from colorless to a purple-gray color.

A small sample of a cast sheet (1 centimeter × 1 centimeter × 1/32 inch [0.08 centimeter]) prepared from about 80 percent diethylene glycol bis(allyl carbonate) and 20 percent vinyl acetate was immersed in the same photochromic solution and placed in a 100° C. oven for three and one-half hours. Upon irradiation with ultraviolet light, the sample changed from colorless to purple-gray.

EXAMPLE 2

The procedure of Example 1 was followed using 0.0803 1 grams of 5,7-dimethoxy-1'3'3'-trimethyl-4'(and 6')-fluorospiro[2H-1,4-benzoxazine-2,2'-indoline] and 0.0118 grams of the spiro(indolino) naphthoxazine substance of Example 1. A small test sample of the polymer prepared from about 80 percent diethylene glycol bis(allyl carbonate) and 20 percent vinyl acetate was immersed in the solution and placed in a 100° C. oven for 90 minutes. The plastic sample was removed from the solution, rinsed with methyl ethyl ketone and irradiated with ultraviolet light. The sample became light gray with a slight purple background.

EXAMPLE 3

The procedure of Example 1 was followed utilizing a solution prepared from 0.0997 grams of the spiro(indolino) benzoxazine compound of Example 1 and 0.0047 grams of 9'-methoxy-1,3,3-trimethylspiro[benz[e] indolino-2,3'[3H]naphth[2,1-b][1,4] oxazine] and 1.5 milliliters of diglyme. A small piece of a plastic test sample (about ½ inch × ½ inch × 1/32 inch [1.27 cm. × 1.27 cm. × 0.08 cm.]) prepared from about 80 percent diethylene glycol bis(allyl carbonate) and 20 percent vinyl acetate was immersed in the solution and placed in a 155° C. oven for 2-½ hours. The vial containing the plastic test sample was cooled to room temperature. The sample was removed from the vial, rinsed with methyl ethyl ketone and dried. Upon irradiation with 365 nanometer ultraviolet light, the sample changed form colorless to gray.

EXAMPLE 4

A solution of the photochromic substances of Example 3 was prepared using 0.041 grams of the spiro(indolino) benzoxazine compound and 0.0085 grams of the spiro(benzindolino) naphthoxazine compound and 1 milliliter of methylene chloride. A piece of Balston No. 50 filter paper was saturated with the solution and allowed to air dry for 2 hours. The paper was then placed on a 4 centimeter by 4 centimeter by 0.08 centimeter thick piece of a plastic test sample prepared from about 80 percent diethylene glycol bis(allyl carbonate) and 20 percent vinyl acetate. A piece of untreated filter paper was placed on the other side of the plastic sample and the sandwich placed between two plates of tempered glass. The entire assembly was then placed in a 155° C. oven for 1-½ hours. After cooling, the plastic test sample was rinsed with methyl ethyl ketone, dried and irradiated with ultraviolet light. The sample turned from colorless to a light gray.

0.5 milliliters of methylene chloride was added to the original solution due to evaporation of the solvent and another piece of filter paper immersed in the solution. The paper absorbed almost all of the solution. The paper was allowed to air dry and then placed on the same piece of plastic test sample on the same side that had been previously treated. A piece of untreated filter paper was placed on the other side of the sample and the sandwich placed between two plates of tempered glass. The assembly was placed in a 155° C. oven for about 2 hours. After the assembly had cooled, the plastic sample was removed, rinsed with methyl ethyl ketone and irradiated with ultraviolet light. The sample turned from a light yellow to gray.

EXAMPLE 5

A photochromic solution was prepared by combining 1.0 milliliters of methylene chloride, 0.096 grams of 5,7-dimethoxy1',3',5'-trimethyl-3'-ethyl-6'-chlorospiro[2H-1,4-benzoxazine2,3,[3H] pyrido[3,2-f][1,4] benzoxazine]. A piece of Balston No. 50 filter paper as described in Example 4 was placed in the solution and then removed and allowed to air dry for 1-¾ hours. The dried filter paper was placed on top of a small sample of undercured plastic prepared from diethylene glycol bis(allyl carbonate) and the assembly placed between two glass plates. The entire assembly was placed in a 150° C. oven for 2 hours. The assembly was allowed to cool to room temperature, the plastic test sample rinsed with methyl ethyl ketone and irradiated with ultraviolet light at 365 nanometers. The sample turned from colorless to blue/gray and faded through a gray stage.

EXAMPLE 6

The procedure of Example 5 was followed using 0.5 milliliters of methylene chloride, 0.059 grams of the spiro(indoline) benzoxazine compound of Example 5 and 0.0092 grams of the spiro(benzindolino) naphthoxazine compound of Example 3. When irradiated with ultraviolet light, the sample turned a bluish gray color. A further sample was prepared utilizing a photochromic solution prepared from 1.0 milliliters of methylene chloride, 0.134 grams of the spiro(indolino) benzoxazine compound and 0.008 grams of the spiro(benzindolino) naphthoxazine compound. Upon irradiation with ultraviolet light, the test sample changed from a light yellow to gray.

EXAMPLE 7

The procedure of Example 5 was followed using a solution prepared from 1.0 milliliters of methylene chloride, 0.095 grams of the spiro(indolino) benzoxazine compound of Example 5 and 0.0086 grams of the spiro(indolino) pyridobenzoxazine compound of Example 5. Upon irradiation with ultraviolet light, the sample changed from a light yellow to a bluish gray color.

EXAMPLE 8

A 2 inch (5.1 centimeter) square of Whatman® 4 filter paper was saturated with a 10 weight percent solution of a 8:1 (mole ratio) mixture of 5,7-dimethoxy-1',3',3',5',6' (and 4') pentamethylspiro[2H1,4-benzoxazine-2,2'-indoline] and 1,3,3,5,6 (and 4)-pentamethylspiro[indoline-2,3'[3H] pyrido[3,2-f][1,4] benzoxazine in toluene. The filter paper was air dried until free of toluene.

The filter paper containing the photochromic compounds was placed on a 2 inch (5.1 centimeter) square, 2.2 millimeters thick slightly undercured plastic sample prepared from diethylene glycol bis(allyl carbonate). The paper covered plastic was placed between two aluminum plates (0.125 inch ×2.25 inch ×2.25 inch [.3175 centimeters ×5.715 centimeters ×5.715 centimeters]) and the assembly heated in an oven at 150° C. for 90 minutes. The assembly was cooled and the photochromic surface of the cooled plastic cleaned with acetone. The foregoing imbibition process was repeated using a fresh sample of filter Paper containing an identical mixture of the aforedescribed photochromic compounds to treat the photochromic surface of the cleaned plastic sample.

After another acetone cleaning, the photochromic plastic sample was tinted sequentially with A.O. Autumn and then Rodenstock Maron dyes (Brain Power, Inc.) by immersing it in an aqueous dispersed dye bath for less than 2 minutes at 83° C. The resulting yellow-brown plastic had a luminous transmission of 80 percent.

The photochromic tinted plastic sample was exposed to simulated solar radiation from a 1000 watt xenon lamp (UV intensity at 365 nanometers =1.25 mW per square centimeter). The temperature of the sample was maintained at 25° C. After activation, the sample was gray with a luminous transmission of 46 percent.

EXAMPLE 9

A 2 inch (5.1 centimeter) square of Whatman® 4 filter paper was saturated with a 10 weight percent solution of a 8:1 (mole ratio) mixture of 5,7-dimethoxy-3',3'-dimethyl-1'-n-propylspiro[2H-1,4-benzoxazine-2,2'-indoline] and 1-n-propyl-3,3-dimethyl-5-methoxyspiro[indolino-2,3'[3H] pyrido [3,2-f][1,4] benzoxazine] in toluene. The filter paper was air dried until free of toluene.

The filter paper containing the photochromic compounds was placed on a 2 inch (5.1 centimeter) square 2.2 millimeters thick slightly undercured plastic sample prepared from diethylene glycol bis(allyl carbonate). The filter paper covered plastic sample was placed between two aluminum plates (0.125 inch ×2.25 inch ×2.25 inch [0.3175 centimeters ×5.715 centimeters ×5.715 centimeters]) and the assembly heated in an oven at 150° C. for 90 minutes. The assembly was cooled and the photochromic surface of the cooled plastic cleaned with acetone. The foregoing imbibition process was repeated using a fresh sample of filter paper containing an identical mixture of photochromic compounds to treat the photochromic surface of the cleaned plastic sample.

After another acetone cleaning, the photochromic sample was tinted with A. 0. Cosma-Lite (Brain Power, Inc.) by immersing it in an aqueous dispersed dye bath for less than 2 minutes at 83° C. The resulting light brown plastic sample had a luminous transmission of 74 percent.

The photochromic tinted plastic sample was exposed to simulated solar radiation from a 1000 watt xenon lamp (UV intensity at 365 nanometers =1.25 mW per square centimeter). The temperature of the sample was maintained at 78° F.(25° C.). After activation, the sample was gray with a luminous transmission of 42 percent. The chromaticity coordinates after activation were: $x=0.276$, $y=0.306$, as measured on a Spectrogard Color Spectrophotometer.

EXAMPLE 10

The procedure described in Example 9 was repeated except that the final tinting operation was omitted. The unactivated sample was very slightly yellow in color (luminous transmission =89 percent). The sample was exposed to solar radiation (UV intensity at 365 nanometers =0.94 mW per square centimeter) for 30 minutes at 7.5° C. The activated sample was blue-gray with a luminous transmission of 23 percent. After fading to a luminous transmission of 40 percent, the chromaticity coordinates were determined to be: $x=0.267$, $y=0.280$.

EXAMPLE 11

The general procedure of Example 9 was used to prepare a plastic sample using only 1-n-propyl-3,3-dimethyl-5-methoxyspiro[indolino-2-3'[3H] pyrido [3,2-f][1,4] benzoxazine]. Only one imbibition procedure was used and the plastic sample was not tinted. Upon exposure to solar radiation, the very light yellow sample became bright blue. The chromaticity coordinates determined at 40 percent luminous transmission were: $x=0.216$, $y=0.253$.

Although the present invention has been described with reference to specific details of certain embodiments thereof, it is not intended that such details should be regarded as limitations upon the scope of the invention, except as and to the extent that they are included in the accompanying claims.

We claim:

1. A photochromic article comprising an organic host material and (a) a first organic photochromic substance selected from the group consisting of spiro(indolino) naphthoxazines, spiro(indolino) pyridobenzoxazines, spiro(benzindolino) pyridobenzoxazines and spiro(benzindolino) naphthoxazines, and having an activated absorption maximum in the visible range of greater than 590 nanometers in said host material, and (b) a second organic photochromic spiro(indolin) benzoxazine substance having at least one activated absorption maximum in the visible range of between about 400 nanometers and less than 590 nanometers in said host material, said first and second organic photochromic substances being present in combination in said host material in the photochromic amounts and in such a relative proportion that the spectral characteristics of the organic host material is a near neutral color when the host material is exposed to solar radiation.

2. The article of claim 1 wherein the mole ratio of the first organic photochromic substance to the second organic photochromic substance varies from about 1:0.5 to about 1:15.

3. The article of claim 1 wherein the mole ratio of the first organic photochromic substance to the second organic photochromic substance varies between about 1:4 and about 1:12.

4. The article of claim 1 wherein the first organic photochromic substance exhibits an activated absorption maximum in the visible range of from greater than 590 nanometers to about 700 nanometers.

5. The article of claim 1 wherein the first organic photochromic substance may be represented by the following graphic formula:

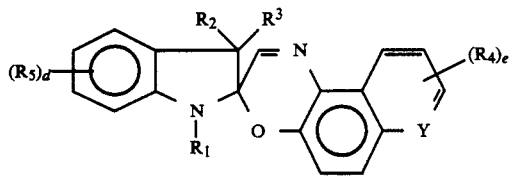

wherein,
(a) $R_1$ is selected from the group consisting of $C_1$–$C_8$ alkyl, phenyl, phen($C_1$–$C_4$)alkyl, naphth($C_1$–$C_4$)-alkyl, allyl, acrylyl($C_2$–$C_6$)alkyl, methacrylyl ($C_2$–$C_6$)alkyl, carboxy($C_2$–$C_6$)alkyl, cyano($C_2$–$C_6$)alkyl, $C_1$–$C_4$ acyloxy($C_2$–$C_6$)alkyl, hydroxy($C_2$–$C_6$)alkyl, $(C_2H_4O)_mCH_3$, wherein m is a number of from 1 to 6, and mono- and di-substituted phenyl, said phenyl substituents being selected from $C_1$–$C_4$ alkyl and $C_1$–$C_5$ alkoxy;
(b) $R_2$ and $R_3$ are each selected from the group consisting of $C_1$–$C_5$ alkyl, phenyl, mono- and di-substituted phenyl, benzyl, or combine to form a cyclic ring selected from the group consisting of an alicyclic ring containing from 6 to 8 carbon atoms (including the spiro carbon atom), norbornyl and adamantyl, said phenyl substituents being selected from $C_1$–$C_4$ alkyl and $C_1$–$C_5$ alkoxy;
(c) Y is selected from carbon and nitrogen;
(d) each $R_4$, when Y is carbon, is selected from the group consisting of halogen, $C_1$–$C_5$ alkyl, $C_1$–$C_5$ alkoxy. nitro, cyano, thiocyano, $C_1$–$C_4$ monohaloalkyl, $C_1$–$C_2$ polyhaloalkyl, and mono- or di alkylamino;
(e) each $R_4$, when Y is nitrogen, is selected from the group consisting of $C_1$–$C_5$ alkyl, $C_1$–$C_5$ alkoxy and halogen;
(f) each $R_5$ is selected from the group consisting of $C_1C_5$ alkyl, halogen, $C_1$–$C_5$ alkoxy, nitro, cyano, $C_1$–$C_4$ monohaloalkyl, $C_1$–$C_4$ polyhaloalkyl, $C_1$–$C_8$ alkoxycarbonyl, $C_1$–$C_4$ acyloxy, phenylene and substituted phenylene, said phenylene substituents ranging in number from 0 to 2 and being selected from the group consisting of halogen, $C_1$–$C_5$ alkyl, $C_1$–$C_5$ alkoxy, cyano, $C_1$–$C_8$ alkoxycarbonyl, $C_1$–$C_2$ polyhaloalkyl, $C_1$–$C_4$ monohaloalkyl, and mono- or di($C_1$–$C_4$) alkylamino; and
(g) e is an integer of from 0 to 2, and d is an integer of from 0 to 4; provided that when an $R_5$ substituent is phenylene or substituted phenylene, d is a number of from 1 to 2 and when d is 2 the second substituent is other than a phenylene group.

6. The article of claim 5 wherein the first organic photochromic substance may be represented by the following graphic formula:

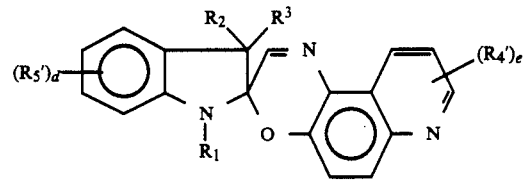

wherein:
(a) $R_1$ is selected from the group consisting of $C_1$–$C_4$ alkyl, phenyl, benzyl, 1-naphth($C_1$–$C_2$)alkyl, carboxy($C_2$–$c_4$)alkyl, cyano($C_2$–$C_4$)alkyl, $C_1$–$C_4$ acyloxy($C_2$–$C_4$)alkyl, hydroxy($C_2$–$C_4$)alkyl and $(C_2H_4O)_mCH_3$, wherein m is a number of from 1 to 3,
(b) $R_2$ and $R_3$ are each selected from the group consisting of $C_1$–$C_5$ alkyl and phenyl,
(c) each $R'_4$ is selected from the group consisting of $C_1$–$C_5$ alkyl, $C_1$–$C_5$ alkoxy and halogen, and the letter e is a number from 0 to 1,
(d) each $R_5$, is selected from the group consisting of $C_1$–$C_5$ monohaloalkyl, $C_1$–$C_4$ polyhaloalkyl, $C_1$–$C_8$ alkoxycarbonyl and $C_1$–$C_4$ acyloxy, and the letter d is an integer of from 0 to 4.

7. The article of claim 6 wherein the first organic photochromic substance is selected from the group consisting of (a) 1,3,3-trimethylspiro[indolino-2,3'[3H] pyrido[3,2-f][1,4] benzoxazine], (b) 1,3,3,5,6(and 4)-pentamethylspiro[indolino-2,3'[3H] pyrido[3,2-f][1,4] benzoxazine], and (c) 1-n-propyl-3,3-dimethyl-5-methoxyspiro[indolino-2,3'[3H] pyrido[3,2-f][1,4] benzoxazine].

8. The article of claim 1 wherein the first organic photochromic substance may be represented by the following graphic

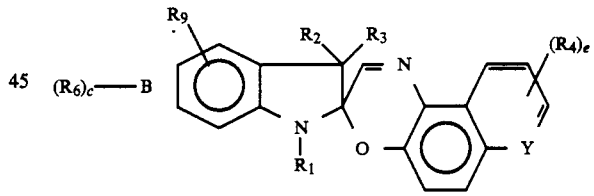

wherein,
(a) Ring B is a substituted or unsubstituted benzene ring fused at the e, f, or g face of the indolino segment of the substance,
(b) $R_9$ is selected from the group consisting of hydrogen, halogen, $C_1$–$C_5$ alkyl, $C_1$–$C_5$ alkoxy, $C_1$–$C_4$ monohaloalkyl, $C_1$–$C_2$ polyhaloalkyl, cyano and $C_1$–$C_8$ alkoxycarbonyl,
(c) $R_6$ is selected from the group consisting of halogen, $C_1$–$C_5$ alkyl, $C_1$–$C_5$ alkoxy, cyano, $C_1$–$C_8$ alkoxycarbonyl, $C_1$–$C_4$ monohaloalkyl, $C_1$–$C_2$ polyhaloalkyl and mono- or di($C_1$–$C_4$)alkylamino,
(d) the letter c is a number of from 0 to 2, and
(e) $R_1$, $R_2$, $R_3$, $R_4$, Y and the letter e are the same as defined in claim 6.

9. The article of claim 8 wherein the first organic photochromic substance is selected from the group consisting of: 9'-methoxy-1,3,3-trimethylspiro[benz[g]

indolino-2,3'[3H] naphth[2,1-b]-[1,4] oxazine], and 9'-methoxy-1,3,3-trimethylspiro[benz[e]indolino 2,3'[3H] naphth[2,1-b][1,4]oxazine].

10. The article of claim 1 wherein the second organic photochromic substance may be represented by the following graphic formula,

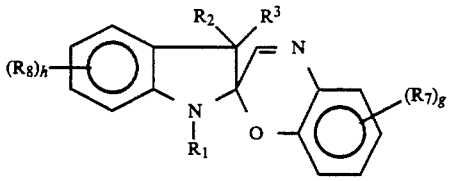

wherein
(a) $R_1$ is selected from the group consisting of $C_1$-$C_8$ alkyl, phenyl, phen($C_1$-$C_4$)alkyl, naphth($C_1$-$C_4$)alkyl, allyl, acrylyl($C_2$-$C_6$)alkyl, methacrylyl ($C_2$-$C_6$)alkyl, carboxy($C_2$-$C_4$)alkyl, cyano($C_2$-$C_6$)alkyl, $C_1$-$C_4$ acyloxy($C_2$-$C_6$)alkyl, hydroxy($C_2$-$C_6$)alkyl, ($C_2H_4O)_mCH_3$, wherein m is a number of from 1 to 6, and mono- and di-substituted phenyl, said phenyl substituents being selected from $C_1$-$C_4$ alkyl and $C_1$-$C_5$ alkoxy;

$R_2$ and $R_3$ are each selected from the group consisting of $C_1$-$C_5$ alkyl, phenyl, mono- and di-substituted phenyl, benzyl, or combine to form a cyclic ring selected from the group consisting of an alicyclic ring containing from 6 to 8 carbon atoms (including the spiro carbon atom), norbornyl and adamantyl, said phenyl substituents being selected from $C_1$-$C_4$ alkyl and $C_1$-$C_5$ alkoxy;

(c) each $R_7$ is selected from the group consisting of halogen, $C_1$-$C_4$ alkyl, $C_1$-$C_5$ alkoxy, nitro, cyano, thiocyano, $C_1$-$C_4$ monohaloalkyl, $C_1$-$C_2$ polyhaloalkyl, and mono- or di($C_1$-$C_4$)alkylamino, the letter g is an integer of from 1 to 4, and (d) each $R_8$ is selected form the group consisting of $C_1$-$C_5$ alkyl, halogen, $C_1$-$C_5$ alkoxy, nitro, cyano, $C_1$-$C_4$ monohaloalkyl, $C_1$-$C_4$ polyhaloalkyl, $C_1$-$C_8$ alkoxycarbonyl and $C_1$-$C_4$ acyloxy, and the letter h is an integer of from 0 to 4.

11. The article of claim 10 wherein the second organic photochromic substance is selected from the group consisting of:
(a) 5,7-dimethoxy-1',3'-dimethyl-3'-ethyl-4'(and 6') fluorospiro[2H-1,4- benzoxazine-2,2'-indoline],
(b) 5,7-dimethoxy-1',3',3'-trimethyl-4'(and 6') fluorspiro[2-H-1,4-benzoxazine-2,2'-indoline],
(c) 5,7-dimethoxy-1',3',5'-trimethyl-3'-ethyl-6'-chlorospiro[2H-1,4-benzoxazine-2,2'-indoline],
(d) 5,7-dimethoxy-1',3',3',5',6'(and 4') pentamethylspiro-[2H-1,4-benzoxazine-2,2'-indoline], and
(e) 5,7-dimethoxy-3',3'-dimethyl-1'-n-propylspiro[2H-1-,4-benzoxazine-2,2'-indoline].

12. The article of claim 1 wherein the host material is selected from the group consisting essentially of homopolymers and copolymers of diethylene glycol bis(allyl carbonate), polyacrylates, poly(alkylacrylates), homopolymers and copolymers of polyfunctional acrylate monomers, cellulose acetate, cellulose triacetate, cellulose acetate propionate, cellulose acetate butyrate, poly(vinyl acetate), poly(vinyl alcohol), poly(vinyl chloride), poly(vinylidene chloride), polycarbonate, polyurethanes, poly(ethylene terephthalate), polystyrene, copoly(styrene-methylmethacrylate), copoly(styrene-acrylonitrile), polyvinylbutyral, and homopolymers and copolymers of diallylidene pentaerythritol.

13. A photochromic article of a solid transparent organic plastic host material that contains (a) a first organic photochromic substance having an activated absorption maximum in the visible range between about 600 and 650 nanometers in said host that is selected from the group consisting of spiro(indolino)naphthoxazines, spiro(indolino)pyridobenzoxazines, spiro(benzindolino) naphthoxazines and spiro(benzindolino)pyridobenzoxazines, and (b) a spiro(indolino) benzoxazine second organic photochromic substance having at least one activated absorption maximum in the visible range of between about 400 and,570 nanometer in said host, said first and second organic photochromic substances being present in combination in photochromic amounts and in such a relative proportion that the spectral characteristics of the plastic host material is a near neutral color when the host material is exposed to solar radiation.

14. The photochromic article of claim 13 wherein the plastic host material is selected from the group consisting essentially of homopolymers and copolymers of diethylene glycol bis(allyl carbonate), polyacrylates, poly(alkylacrylates), homopolymers and copolymers of polyfunctional acrylate monomers, cellulose acetate, cellulose triacetate, cellulose acetate propionate, cellulose acetate butyrate, poly(vinyl acetate), poly(vinyl alcohol), poly(vinyl chloride), poly(vinylidene chloride), polycarbonate, polyurethanes, poly(ethylene terephthalate) polystyrene, copoly(styrene-methylmethacrylate), copoly(styrene-acrylonitrile), polyvinylbutyral, and homopolymers and copolymers of diallylidene pentaerythritol.

15. The photochromic article of claim 14 wherein the mole ratio of the first organic photochromic substance to the second organic photochromic substance varies from about 1:4 to 1:12.

16. The photochromic article of claim 15 wherein the article is an ophthalmic lens.

17. The photochromic article of claim 16 wherein the plastic host material is prepared from homopolymers and copolymers of diethylene glycol bis(allyl carbonate).

18. The photochromic article of claim 15 wherein the first organic photochromic substance is represented by the following graphic formula,

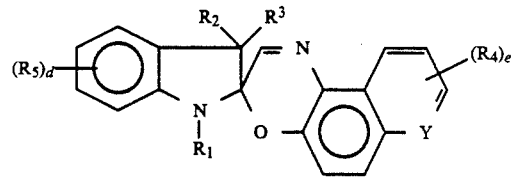

and the second organic photochromic substance is represented by the following graphic formula,

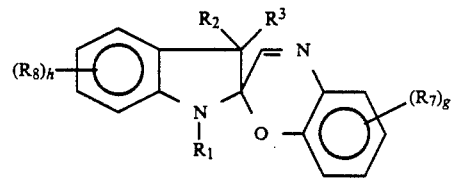

wherein:

(a) $R_1$ is selected from the group consisting of $C_1$-$C_4$ alkyl, phenyl, benzyl, 1-naphth-($C_1$-$C_2$)alkyl, carboxy($C_2$-$C_4$)alkyl, cyano($C_2$-$C_4$)alkyl, $C_1$-$C_4$)acyloxy($C_2$-$C_4$)alkyl, hydroxy($C_2$-$C_4$)alkyl and $(C_2H_4O)_mCH_3$ wherein m is a number of from 1 to 3, (b) $R_2$ and $R_3$ are each selected from the group consisting of $C_1$-$C_5$ alkyl and phenyl, (c) Y is selected from carbon and nitrogen, (d) each $R_4$, when Y is carbon, is selected from the group consisting of $C_1$-$C_2$ alkyl, $C_1$-$C_2$ alkoxy, halogen, nitro, and $C_1$-$C_2$ polyhaloalkyl, (e) each $R_4$, when Y is nitrogen, is selected from the group consisting of $C_1$-$C_2$ alkyl, $C_1$-$C_2$ alkoxy and halogen, (f) each $R_5$ is selected from the group consisting of $C_1$-$C_5$ alkyl, halogen, $C_1$-$C_5$ alkoxy, nitro, cyano, $C_1$-$C_4$ monohaloalkyl, $C_1$-$C_4$ polyhaloalkyl, $C_1$-$C_8$ alkoxycarbonyl, $C_1$-$C_4$ acyloxy, phenylene and substituted phenylene, said phenylene substituents ranging in number from 0 to 2 and being selected from the group consisting of halogen, $C_1$-$C_5$ alkyl. $C_1$-$C_5$ alkoxy, cyano, $C_1$-$C_8$ alkoxycarbonyl, $C_1$-$C_2$ polyhaloalkyl, $C_1$-$C_4$ monohaloalkyl, and mono- or di($C_1$-$C_4$) alkylamino, (g) e is an integer of from 0 to 2, and d is an integer of from 0 to 4; provided that when an R5 substituent is phenylene or substituted phenylene, d is an integer of from 1 to 2 and when d is 2 the second substituent is other than a phenylene group, (h) each $R_7$ is a $C_1$-$C_2$ alkyl, $C_1$-$C_2$ alkoxy, halogen, nitro or trihaloalkyl, (i) each $R_8$ is a $C_1$-$C_2$ alkyl, halogen, $C_1$-$C_5$ alkoxy or $C_1$-$C_2$ trihaloalkyl, (j) g is an integer of from 1 to 2, and h is an integer of from 0 to 2.

19. The photochromic article of claim 18 wherein the plastic host material is prepared from homopolymers and copolymers of diethylene glycol bis(allyl carbonate).

20. The photochromic article of claim 19 wherein the article is an ophthalmic lens.

21. A composition comprising an organic solvent containing (a) a first organic photochromic substance selected from the group consisting of spiro(indolino) naphthoxazines, spiro(indolino) pyridobenzoxazines, spiro(benzindolino) pyridobenzoxazines and spiro(benzindolino) naphthoxazines, and having an activated absorption maximum in the visible range of greater than 590 nanometers and (b) a second organic photochromic spiro(indolino) benzoxazine substance having at least one activated absorption maximum in the visible range of between about 400 nanometers and less than 590 nanometers, the mole ratio of (a) to (b) being from about 1:0.5 to about 1:15, and being such that the spectral characteristics of the composition is a near neutral color when the composition is exposed to solar radiation.

22. The composition of claim 21 wherein the first organic photochromic substance is represented by the following graphic formula,

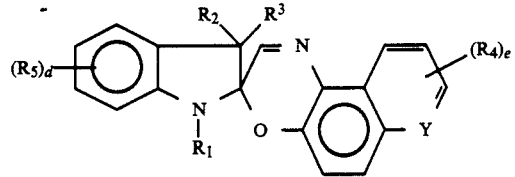

and the second organic photochromic substance is represented by the following graphic formula,

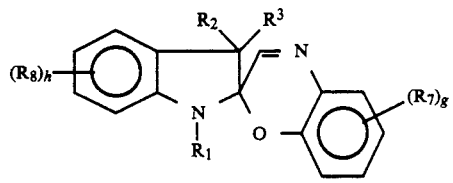

wherein
(a) $R_1$ is selected from the group consisting of $C_1$-$C_4$ alkyl, phenyl, benzyl, 1-naphth-($C_1$-$C_2$)alkyl, carboxy($C_2$-$C_4$)alkyl, cyano($C_2$-$C_4$)alkyl, $C_1$-$C_4$)acyloxy($C_2$-$C_4$)alkyl, hydroxy($C_2$-$C_4$)alkyl and $(C_2H_4O)_mCH_3$ wherein m is a number of from 1 to 3, (b) $R_2$ and $R_3$ are each selected from the group consisting of $C_1$-$C_5$ alkyl and phenyl, (c) Y is selected from carbon and nitrogen.

(d) each $R_4$, when Y is carbon, is selected from the group consisting of $C_1$-$C_2$ alkyl, $C_1$-$C_2$ alkoxy, halogen, nitro, and $C_1$-$C_2$ polyhaloalkyl, (e) each $R_4$, when Y is nitrogen, is selected from the group consisting of $C_1$-$C_2$ alkyl, $C_1$-$C_2$ alkoxy and halogen, (f) each $R_5$ is selected from the group consisting of $C_1$-$C_5$ alkyl, halogen, $C_1$-$C_5$ alkoxy, nitro, cyano, $C_1$-$C_4$ monohaloalkyl, $C_1$-$C_4$ polyhaloalkyl, $C_1$-$C_8$ alkoxycarbonyl, $C_1$-$c_4$ acyloxy, phenylene and substituted phenylene, said phenylene substituents ranging in number from 0 to 2 and being selected from the group consisting of halogen, $C_1$-$C_5$ alkyl, $C_1$-$C_5$ alkoxy, cyano, $C_1$-$C_8$ alkoxycarbonyl, $C_1$-$C_2$ polyhaloalkyl, $C_1$-$C_4$ monohaloalkyl, and mono- or di($C_2$-$C_4$) alkylamino, (g) e is an integer of from 0 to 2, and d is an integer of from 0 to 4; provided that when an $R_5$ substituent is phenylene or substituted phenylene, d is an integer of from 1 to 2 and when d is 2 the second substituent is other than a phenylene group, (h) each $R_7$ is a $C_1$-$C_2$ alkyl, $C_1$-$C_2$ alkoxy, halogen, nitro or trihaloalkyl, (i) each $R_8$ is a $C_1$-$C_2$ alkyl, halogen, $C_1$-$C_5$ alkoxy or $C_1$-$C_5$ trihaloalkyl, (j) g is a number of from 1 to 2, and h is a number of from 0 to 2.

23. The composition of claim 22 wherein the organic solvent is selected from the group consisting of benzene, toluene, methyl ethyl ketone, acetone, and ethanol.

* * * * *

UNITED STATES PATENT AND TRADEMARK OFFICE
CERTIFICATE OF CORRECTION

PATENT NO. : 4,968,454
DATED : November 6, 1990
INVENTOR(S) : John C. Crano et al It is certified that error appears in the above-identified patent and that said Letters Patent is hereby corrected as shown below:

Claim 1, column 28, line 61, "spiro(indolin)" should be --spiro(indolino)--.

Claim 5, column 29, line 57, "$C_1C_5$ alkyl" should be --$C_1$-$C_5$ alkyl--.

Claim 6, column 30, line 18, "carboxy($C_2$-$c_4$)alkyl" should be --carboxy($C_2$-$C_4$)alkyl--;

column 30, line 24, "$R'_4$" should be --$R_4'$--;

column 30, line 26, "a number" should be --an integer--;

column 30, line 27, "$R_5$" should be --$R_5'$--;

column 30, line 27, "consisting of $C_1$-$C_5$ monohaloalkyl" should be --consisting of $C_1$-$C_5$ alkyl, halogen, $C_1$-$C_5$ alkoxy, nitro, cyano, $C_1$-$C_4$ monohaloalkyl--.

Claim 8, column 30, line 40, "following graphic" should be --following graphic formula:--;

column 30, line 45, B should be enclosed in a semi-circle attached to the benzene ring as shown in graphic formula IV in column 11;

column 30, line 63, "a number" should be --an integer--;

column 31, line 26, "$R_2$ and $R_3$" should be --(b) $R_2$ and $R_3$--.

Claim 10, column 31, line 41, "alkyl, halogen, $Cl^{-C_5}$" should be --alkyl, halogen, $C_1$-$C_5$--.

UNITED STATES PATENT AND TRADEMARK OFFICE
CERTIFICATE OF CORRECTION

| | | |
|---|---|---|
| PATENT NO. | : | 4,968,454 |
| DATED | : | November 6, 1990 |
| INVENTOR(S) | : | John C. Crano et al |

It is certified that error appears in the above-identified patent and that said Letters Patent is hereby corrected as shown below:

Claim 13, column 32, line 14, "and,570 nanometer" should be --and 570 nanometers--.

Claim 18, column 33, line 28, "R5" should be --$R_5$--.

Claim 22, column 34, line 40, "$C_1-c_4$" should be --$C_1-C_4$--;

column 34, line 56, "a number" in both instances should be --an integer--.

Signed and Sealed this

Eighth Day of September, 1992

Attest:

DOUGLAS B. COMER

Attesting Officer      Acting Commissioner of Patents and Trademarks